US011877215B2

(12) United States Patent
Ying et al.

(10) Patent No.: US 11,877,215 B2
(45) Date of Patent: Jan. 16, 2024

(54) V2X MESSAGE TRANSMISSION METHOD, DEVICE, AND SYSTEM

(71) Applicant: HUAWEI TECHNOLOGIES CO., LTD., Guangdong (CN)

(72) Inventors: Jiangwei Ying, Beijing (CN); Meng Li, Beijing (CN); Xiao Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/325,715

(22) Filed: May 20, 2021

(65) Prior Publication Data
US 2021/0274329 A1 Sep. 2, 2021

Related U.S. Application Data

(63) Continuation of application No. PCT/CN2019/119696, filed on Nov. 20, 2019.

(30) Foreign Application Priority Data

Nov. 20, 2018 (CN) .......................... 201811386032.4

(51) Int. Cl.
*H04W 4/40* (2018.01)
*H04W 76/11* (2018.01)
(Continued)

(52) U.S. Cl.
CPC ............... *H04W 4/40* (2018.02); *H04W 4/12* (2013.01); *H04W 28/0268* (2013.01); *H04W 76/11* (2018.02)

(58) Field of Classification Search
CPC ......... H04W 4/40; H04W 76/11; H04W 4/12; H04W 28/0268
(Continued)

(56) References Cited

U.S. PATENT DOCUMENTS

2016/0219024 A1* 7/2016 Verzun ...................... H04L 9/34
2017/0079059 A1* 3/2017 Li ............................ H04W 16/02
(Continued)

FOREIGN PATENT DOCUMENTS

CN 107637108 A 1/2018
WO 2017197649 A1 11/2017
(Continued)

OTHER PUBLICATIONS

3GPP TS 22.185 V15.0.0, "3rd Generation Partnership Project; Technical Specification Group Services and System Aspects- ;Service requirements for V2X services; Stage 1 (Release 15)," Jun. 2018, 14 pages.
(Continued)

*Primary Examiner* — Nghi H Ly
(74) *Attorney, Agent, or Firm* — Fish & Richardson P.C.

(57) ABSTRACT

Embodiments of this disclosure provides vehicle to everything (V2X) message transmission methods, devices, and systems. One method comprises: determining, by a terminal device, identification information of a first V2X message, wherein the identification information of the first V2X message comprises at least one of a service identifier of the first V2X message or a communication layer identifier of the first V2X message; determining, by the terminal device, a first identifier identifying a first quality of service (QoS) flow based on the identification information of the first V2X message and at least one packet filter set; and sending, by the terminal device, the first V2X message by using the first QoS flow.

20 Claims, 10 Drawing Sheets

(51) Int. Cl.
*H04W 4/12* (2009.01)
*H04W 28/02* (2009.01)

(58) Field of Classification Search
USPC .................. 370/329, 328, 38, 341, 345, 350
See application file for complete search history.

(56) References Cited

U.S. PATENT DOCUMENTS

2018/0213446 A1* 7/2018 Chun ..................... H04W 8/24
2019/0239039 A1* 8/2019 Hahn .................. H04W 84/005

FOREIGN PATENT DOCUMENTS

| WO | 2018117774 A1 | 6/2018 |
|---|---|---|
| WO | 2018205155 A1 | 11/2018 |

OTHER PUBLICATIONS

3GPP TS 22.186 V16.0.0, "3rd Generation Partnership Project; Technical Specification Group Services and System Aspects; Enhancement of 3GPP support for V2X scenarios; Stage 1 (Release 16)," Sep. 2018, 16 pages.

3GPP TS 23.285 V15.1.0, "3rd Generation Partnership Project; Technical Specification Group Services and System Aspects; Architecture enhancements for V2X services (Release 15)," Jun. 2018, 36 pages.

3GPP TS 23.501 V15.3.0, "3rd Generation Partnership Project; Technical Specification Group Services and System Aspects;System Architecture for the 5G System;Stage 2 (Release 15)," Sep. 2018, 226 pages.

ETSI TS 123 501 V15.3.0 (Sep. 2018), "5G; System Architecture for the 5G System (3GPP TS 23.501 version 15.3.0 Release 15," Sep. 2018, 5 pages.

Huawei, HiSilicon, "Radio bearer configuration and management for NR sidelink," 3GPP TSG RAN WG2 #104, R2-1816522, Spokane, USA, Nov. 12-16, 2018, 5 pages.

Office Action issued in Japanese Application No. 2021-527919 dated Jul. 5, 2022, 12 pages (with English translation).

Qualcomm Incorporated, "Discussion on QoS design for NR PC5 communication," 3GPP TSG RAN WG2 #104 R2-1817776, Spokane, USA, Nov. 12-16, 2018, 4 pages.

Extended European Search Report issued in European Application No. 19887384.6 dated Sep. 10, 2021, 9 pages.

Fraunhofer HHI et al., "QoS Management for NR V2X," 3GPP TSG-RAN WG2 #104, R2-1816770, Spokane, USA, Nov. 12-16, 2018, 4 pages.

Zte et al., "Consideration on QoS management for NR V2X," 3GPP TSG-RAN WG2 #104, R2-1816988, Spokane, USA, Nov. 12-16, 2018, 4 pages.

3GPP TS 24.386 V15.1.0 (Sep. 2018), "3rd Generation Partnership Project; Technical Specification Group Core Network and Terminals; User Equipment (UE) to V2X control function; protocol aspects; Stage 3 (Release 15)," Sep. 2018, 35 pages.

Qualcomm Incorporated et al., "V2V Work Item Completion," 3GPP RAN #73, RP-161788, New Orleans, USA, Sep. 19-22, 2016, 3 pages.

Office Action in Chinese Application No. 201811386032.4, dated Sep. 27, 2020, 12 pages.

Office Action in Chinese Application No. 201811386032.4, dated Apr. 29, 2021, 7 pages.

PCT International Search Report and Written Opinion in International Application No. PCT/CN2019/119696, dated Feb. 24, 2020, 15 pages.

* cited by examiner

V2X MESSAGE TRANSMISSION METHOD, DEVICE, AND SYSTEM

CROSS-REFERENCE TO RELATED APPLICATIONS

This application is a continuation of International Application No. PCT/CN2019/119696, filed on Nov. 20, 2019, which claims priority to Chinese Patent Application No. 201811386032.4, filed on Nov. 20, 2018. The disclosures of the aforementioned applications are hereby incorporated by reference in their entireties.

TECHNICAL FIELD

Embodiments of this application relate to the communications field, and in particular, to a vehicle to everything (V2X) message transmission method, a device, and a system.

BACKGROUND

In a V2X communications system, there are a plurality of different types of V2X messages, for example, a vehicle to vehicle (V2V) message, a vehicle to pedestrian (vehicle to person, V2P) message, a vehicle to network (V2N) message, a vehicle to infrastructure (V2I) message, an anti-collision message between vehicles, an entertainment application message, and a navigation message exchanged between vehicles. These V2X messages may have different quality of service (QoS) requirements. The V2V message and the V2N message are used as an example. The V2V message has requirements on transmission such as a low latency and high reliability, and the V2N message does not have a high requirement on a transmission latency.

To meet the QoS requirements of the V2X messages, the V2X messages having the different QoS requirements may be transmitted through different communications interfaces. For example, a PC5 interface is a direct communications interface between vehicles, and the PC5 interface has characteristics of a low transmission latency and high transmission reliability; a Uu interface is a communications interface between a terminal and a network, and compared with the PC5 interface, the Uu interface has a characteristic of a high transmission latency. In this case, if the V2V message is transmitted through the PC5 interface, a QoS requirement of the V2V message can be met; if the V2V message is transmitted through the Uu interface, a latency is relatively high, and a QoS requirement of the V2V message cannot be met.

In the current technology, an application layer of a terminal selects a communications interface used to transmit a V2X message. To be specific, the application layer of the terminal determines whether the V2X message generated by the application layer is transmitted through a Uu interface or a PC5 interface, and then a bottom layer of the terminal transmits the V2X message through the communications interface selected by the application layer of the terminal. However, because the application layer of the terminal cannot perceive a current communication capability of the communications interface and the like, the following problem is easily caused: The V2X message generated by the application layer of the terminal cannot be transmitted through the communications interface selected by the application layer of the terminal, or a QoS requirement of the V2X message cannot be met when the V2X message generated by the application layer of the terminal is transmitted through the communications interface selected by the application layer of the terminal.

SUMMARY

Embodiments of this application provide a V2X message transmission method, a device, and a system, to resolve a problem caused by an application layer of a terminal autonomously selecting a communications interface for transmitting a V2X message.

To achieve the foregoing objective, the following technical solutions are used in the embodiments of this application.

According to a first aspect of the embodiments of this application, a V2X message transmission method is provided. The method includes: A terminal obtains a service identifier of a first V2X message; determines a communications interface of the first V2X message based on the service identifier of the first V2X message and a correspondence relationship (which may be referred to as a first correspondence relationship) between a service identifier of a V2X message and at least one communications interface; and sends the first V2X message through the communications interface of the first V2X message.

According to the method provided in the first aspect, the terminal may determine a communications interface of a V2X message based on the correspondence relationship between a service identifier of a V2X message and at least one communications interface, and sends the V2X message through the communications interface of the V2X message. In this way, the correspondence relationship between a service identifier of a V2X message and at least one communications interface may be configured, and the communications interface of the V2X message is determined based on the correspondence relationship between a service identifier of a V2X message and at least one communications interface. Therefore, an application layer of the terminal does not need to autonomously select a communications interface for transmitting the V2X message, so that a problem that the V2X message cannot be sent through the communications interface selected by the application layer of the terminal is avoided, or a problem that a QoS requirement of the V2X message cannot be met when the V2X message is sent through the communications interface selected by the application layer of the terminal is avoided.

In a possible design, with reference to the first aspect, that the terminal determines a communications interface of the first V2X message based on the service identifier of the first V2X message and a first correspondence relationship includes: The terminal determines, based on the first correspondence relationship, at least one communications interface corresponding to the service identifier of the first V2X message; and when the at least one communications interface corresponding to the service identifier of the first V2X message includes at least two communications interfaces, the terminal uses a communications interface with a higher priority in the at least two communications interfaces as the communications interface of the first V2X message, or uses the at least two communications interfaces as the communications interface of the first V2X message.

Based on this possible design, a V2X message may be sent through one communications interface with a higher priority, or a V2X message is sent through two or more communications interfaces. This improves flexibility and reliability of sending the V2X message.

In a possible design, with reference to the first aspect, that the terminal determines a communications interface of the first V2X message based on the service identifier of the first V2X message and a first correspondence relationship includes: The terminal determines, based on the first correspondence relationship, at least one communications interface corresponding to the service identifier of the first V2X message; and when the at least one communications interface corresponding to the service identifier of the first V2X message includes one communications interface, the terminal uses the communications interface corresponding to the service identifier of the first V2X message as the communications interface of the first V2X message. Based on this possible design, a service identifier of a V2X message may be stored with a communications interface that has a one-to-one correspondence relationship with the service identifier, so that one communications interface corresponding to the service identifier of the V2X message is used as a communications interface of the V2X message, and the V2X message is sent through the communications interface.

In a possible design, with reference to any one of the first aspect or the possible designs of the first aspect, the method further includes: The terminal obtains the first correspondence relationship from a V2XCF. Based on this possible design, the V2XCF that centrally controls V2X communication of the terminal may generate the correspondence relationship between a service identifier of a V2X message and at least one communications interface, and send the correspondence relationship between a service identifier of a V2X message and at least one communications interface to the terminal.

According to a second aspect, this application provides a communications apparatus. The communications apparatus may be a terminal, a chip in a terminal, or a system-on-a-chip. The communications apparatus may implement functions performed by the terminal in the foregoing aspect or the possible designs, and the functions may be implemented by hardware, or may be implemented by hardware executing corresponding software. The hardware or the software includes one or more modules corresponding to the foregoing functions. For example, the communications apparatus may include an obtaining unit, a determining unit, and a sending unit.

The obtaining unit is configured to obtain a service identifier of a first V2X message.

The determining unit is configured to determine a communications interface of the first V2X message based on the service identifier of the first V2X message and a correspondence relationship (which may be referred to as a first correspondence relationship) between a service identifier and at least one communications interface.

The sending unit is configured to send the first V2X message through the communications interface of the first V2X message.

For a specific implementation of the communications apparatus, refer to behaviors and functions of the terminal in the V2X message transmission method according to any one of the first aspect or the possible designs of the first aspect. Details are not repeated herein again. Therefore, the provided communications apparatus can achieve same beneficial effects as any one of the first aspect or the possible designs of the first aspect.

According to a third aspect, a communications apparatus is provided. The communications apparatus includes a processor and a memory, where the memory is configured to store a computer-executable instruction; and when the communications apparatus runs, the processor executes the computer-executable instruction stored in the memory, so that the communications apparatus performs the V2X message transmission method according to any one of the first aspect or the possible designs of the first aspect.

According to a fourth aspect, a computer-readable storage medium is provided. The computer-readable storage medium stores an instruction, and when the instruction is run on a computer, the computer is enabled to perform the V2X message transmission method according to any one of the first aspect or the possible designs of the first aspect.

According to a fifth aspect, a computer program product including an instruction is provided. When the computer program product runs on a computer, the computer is enabled to perform the V2X message transmission method according to any one of the first aspect or the possible designs of the first aspect.

According to a sixth aspect of the embodiments of this application, a chip system is provided. The chip system includes a processor and a communications interface, which are configured to support a communications apparatus in implementing functions in the foregoing aspect. For example, the processor obtains a service identifier of a first V2X message, determines a communications interface of the first V2X message based on the service identifier of the first V2X message and a correspondence relationship (which may be referred to as a first correspondence relationship) between a service identifier and at least one communications interface, and sends the first V2X message through the communications interface of the first V2X message. In a possible design, the chip system further includes a memory, and the memory is configured to store a program instruction and data that are necessary for the communications apparatus. The chip system may include a chip, or may include a chip and another discrete component.

For technical effects achieved by any one of the designs of the third aspect to the sixth aspect, refer to technical effects achieved by any one of the first aspect or the possible designs of the first aspect. Details are not described again.

According to a seventh aspect of the embodiments of this application, a V2X message transmission method is provided. The method includes: A V2XCF receives a first request used to request a V2X communications parameter, and sends the V2X communications parameter based on the first request, where the V2X communications parameter includes a correspondence relationship between a service identifier of a V2X message and at least one communications interface.

According to the method in the seventh aspect, the V2XCF that centrally controls and manages V2X communication of a terminal may configure the correspondence relationship between a service identifier and at least one communications interface for the terminal, so that the terminal determines, based on the configuration of the V2XCF, a communications interface for transmitting a V2X message.

In a possible design, with reference to the seventh aspect, the at least one communications interface includes a PC5 interface and/or a Uu interface; and a priority of the PC5 interface is different from a priority of the Uu interface.

Based on this possible design, at least one communications interface corresponding to a service identifier of a V2X message may be configured as a PC5 interface, a Uu interface, or a PC5 interface and a Uu interface. In addition, different priorities are configured for the PC5 interface and the Uu interface, so that when the at least one communications interface includes the PC5 interface and the Uu interface, the terminal selects, from the two communications interfaces, a communications interface with a higher priority based on the priorities of the communications interfaces, and sends the V2X message through the communications interface with the higher priority.

According to an eighth aspect, this application provides a communications apparatus. The communications apparatus may be a vehicle to everything control function, a chip in a vehicle to everything control function, or a system-on-a-chip. The communications apparatus may implement functions performed by the vehicle to everything control function in the seventh aspect or the possible designs of the seventh aspect, and the functions may be implemented by hardware, or may be implemented by hardware executing corresponding software. The hardware or the software includes one or more modules corresponding to the foregoing functions. For example, the communications apparatus may include a receiving unit and a sending unit.

The receiving unit is configured to receive a first request used to request a V2X communications parameter.

The sending unit is configured to send the V2X communications parameter based on the first request, where the V2X communications parameter includes a correspondence relationship between a service identifier of a V2X message and at least one communications interface.

For a specific implementation of the communications apparatus, refer to behaviors and functions of the vehicle to everything control function in the V2X message transmission method according to any one of the seventh aspect or the possible designs of the seventh aspect. Details are not repeated herein again. Therefore, the provided communications apparatus can achieve same beneficial effects as any one of the seventh aspect or the possible designs of the seventh aspect.

According to a ninth aspect, a communications apparatus is provided. The communications apparatus includes a processor and a memory, where the memory is configured to store a computer-executable instruction; and when the communications apparatus runs, the processor executes the computer-executable instruction stored in the memory, so that the communications apparatus performs the V2X message transmission method according to any one of the seventh aspect or the possible designs of the seventh aspect.

According to a tenth aspect, a computer-readable storage medium is provided. The computer-readable storage medium stores an instruction, and when the instruction is run on a computer, the computer is enabled to perform the V2X message transmission method according to any one of the seventh aspect or the possible designs of the seventh aspect.

According to an eleventh aspect, a computer program product including an instruction is provided. When the computer program product runs on a computer, the computer is enabled to perform the V2X message transmission method according to any one of the seventh aspect or the possible designs of the seventh aspect.

According to a twelfth aspect, a chip system is provided. The chip system includes a processor and a communications interface, which are configured to support a communications apparatus in implementing functions in the foregoing aspect. For example, the processor receives, through the communications interface, a first request used to request a V2X communications parameter, and sends the V2X communications parameter based on the first request, where the V2X communications parameter includes a correspondence relationship between a service identifier of a V2X message and at least one communications interface. In a possible design, the chip system further includes a memory, and the memory is configured to store a program instruction and data that are necessary for the communications apparatus. The chip system may include a chip, or may include a chip and another discrete component.

For technical effects achieved by any one of the designs of the ninth aspect to the twelfth aspect, refer to technical effects achieved by any one of the seventh aspect or the possible designs of the seventh aspect. Details are not described again.

According to a thirteenth aspect, an embodiment of this application provides a V2X message transmission method. The method includes: A terminal obtains identification information that is of a first V2X message and that includes a service identifier of the first V2X message and/or a communication layer identifier of the first V2X message; filters the first V2X message into a first QoS flow based on the identification information of the first V2X message and at least one packet filter set; and sends the first V2X message by using the first QoS flow.

According to the method in the thirteenth aspect, the terminal may filter a V2X message into a QoS flow based on identification information of the V2X message and at least one packet filter set, and send the V2X message through a communications interface of the QoS flow, that is, send the V2X message at a granularity of a QoS flow, so that transmission of the V2X message meets a QoS requirement.

In a possible design, with reference to the thirteenth aspect, the at least one packet filter set includes identification information of a V2X message. Based on this possible design, the identification information of the V2X message may be included in the at least one packet filter set, so that the terminal determines, in the at least one packet filter set, a first packet filter set including the identification information of the first V2X message, and filters the first V2X message into a QoS flow corresponding to the first packet filter set.

In a possible design, with reference to the thirteenth aspect or the possible design of the thirteenth aspect, that the terminal filters the first V2X message into a first quality of service flow QoS flow based on the identification information of the first V2X message and at least one packet filter set includes: The terminal determines, based on a correspondence relationship between a packet filter set and an identifier of a QoS flow, an identifier, of a QoS flow, corresponding to the first packet filter set, where the first packet filter set is a packet filter set that is in the at least one packet filter set and that includes the identification information of the first V2X message; and filters the first V2X message into the first QoS flow based on the determined identifier of the QoS flow.

Based on this possible design, the terminal may find the packet filter set including the identification information of the first V2X message, and filter the first V2X message into the QoS flow that corresponds to the packet filter set and that is identified by the identifier of the QoS flow. This is easy and convenient.

In a possible design, with reference to any one of the thirteenth aspect or the possible designs of the thirteenth aspect, the method further includes: The terminal receives the at least one packet filter set from a V2XCF.

Based on this possible design, the V2XCF that centrally controls and manages V2X communication of the terminal may configure a V2X communications parameter including a packet filter set for the terminal, so that the terminal filters a V2X message into a QoS flow based on the packet filter set configured by the V2XCF.

In a possible design, with reference to any one of the thirteenth aspect or the possible designs of the thirteenth aspect, that the terminal sends the first V2X message by using the first QoS flow includes: The terminal sends the first V2X message through a communications interface of the first QoS flow. Based on this possible design, a V2X message may be sent through a communications interface of a QoS flow, to ensure that a QoS requirement of the V2X message is met.

In a possible design, with reference to any one of the thirteenth aspect or the possible designs of the thirteenth aspect, the method further includes: The terminal determines a communications interface of the first V2X message based on the service identifier of the first V2X message and a correspondence relationship between a service identifier and at least one communications interface, and uses the communications interface of the first V2X message as the communications interface of the first QoS flow. Based on this possible design, a notification interface of a V2X message may be used as a communications interface of a QoS flow corresponding to the V2X message, to ensure that the communications interface of the V2X message remains unchanged after the V2X message is filtered into the QoS flow, thereby meeting a transmission requirement of the V2X message.

In a possible design, with reference to any one of the thirteenth aspect or the possible designs of the thirteenth aspect, the method further includes: The terminal determines the communications interface of the first QoS flow based on an identifier of the first QoS flow and a correspondence relationship between an identifier of a QoS flow and a communications interface. Based on this possible design, the correspondence relationship between an identifier of a QoS flow and a communications interface may be established, so that the terminal determines a communications interface of a QoS flow based on the correspondence relationship. This is easy and convenient.

In a possible design, with reference to any one of the thirteenth aspect or the possible designs of the thirteenth aspect, the communication layer identifier of the first V2X message includes one or more of a layer 2 identifier, an IP address, or a UDP port number.

In a possible design, with reference to any one of the thirteenth aspect or the possible designs of the thirteenth aspect, when the identification information of the first V2X message includes the communication layer identifier of the first V2X message, that a terminal obtains identification information of a first V2X message includes: The terminal determines the communication layer identifier of the first V2X message based on the service identifier of the first V2X message and a third correspondence relationship, where the third correspondence relationship is a correspondence relationship between a service identifier of a V2X message and a communication layer identifier of the V2X message. Based on this possible design, the correspondence relationship between a service identifier of a V2X message and a communication layer identifier of the V2X message may be preconfigured, and a communication layer identifier of a V2X message is determined based on the correspondence relationship between a service identifier of a V2X message and a communication layer identifier of the V2X message. This is easy and convenient.

In a possible design, with reference to any one of the thirteenth aspect or the possible designs of the thirteenth aspect, the method further includes: The terminal receives, from the V2XCF, an association indication used to indicate the terminal to associate a communication layer identifier with a service identifier, and generates the third correspondence relationship based on the association indication. Based on this possible design, the terminal may generate the correspondence relationship between a service identifier and a communication layer identifier based on the association indication of the V2XCF, that is, the V2XCF controls and manages a communication layer identifier corresponding to a service identifier, to avoid a conflict in use of communication layer identifiers.

In a possible design, with reference to any one of the thirteenth aspect or the possible designs of the thirteenth aspect, when the identification information of the first V2X message includes the communication layer identifier of the first V2X message, that a terminal obtains identification information of a first V2X message includes: The terminal receives the communication layer identifier of first V2X message from the V2XCF; or the terminal generates the communication layer identifier of the first V2X message. Based on this possible design, the V2XCF or the terminal may generate a communication layer identifier of a V2X message in real time. This is easy and convenient.

In a possible design, with reference to any one of the thirteenth aspect or the possible designs of the thirteenth aspect, after the terminal generates the communication layer identifier of the first V2X message, the method further includes: The terminal sends the communication layer identifier of the first V2X message to the V2XCF; and the terminal receives a notification message from the V2XCF, where the notification message is used to indicate the terminal to use the communication layer identifier of the first V2X message. Based on this possible design, after generating a communication layer identifier, the terminal notifies the V2XCF of the communication layer identifier, and uses the communication layer identifier after the V2XCF determines that the communication layer identifier can be used. The V2XCF controls and manages a communication layer identifier corresponding to a service identifier, to avoid the conflict in use of communication laver identifiers.

In a possible design, with reference to any one of the thirteenth aspect or the possible designs of the thirteenth aspect, the notification message includes the communication layer identifier of the first V2X message. Based on this possible design, after determining that the terminal can use a communication layer identifier, the V2XCF notifies the terminal of the communication layer identifier that can be used.

According to a fourteenth aspect, this application provides a communications apparatus. The communications apparatus may be a terminal, a chip in a terminal, or a system-on-a-chip. The communications apparatus may implement functions performed by the terminal in the thirteenth aspect or the possible designs of the thirteenth aspect, and the functions may be implemented by hardware, or may be implemented by hardware executing corresponding software. The hardware or the software includes one or more modules corresponding to the foregoing functions. For example, the communications apparatus may include an obtaining unit, a determining unit, and a sending unit.

The obtaining unit is configured to obtain identification information that is of a first V2X message and that includes a service identifier of the first V2X message and/or a communication layer identifier of the first V2X message.

The determining unit is configured to filter the first V2X message into a first QoS flow based on the identification information of the first V2X message and at least one packet filter set.

The sending unit is configured to send the first V2X message by using the first QoS flow.

For a specific implementation of the communications apparatus, refer to behaviors and functions of the terminal in the V2X message transmission method according to any one of the fourteenth aspect or the possible designs of the fourteenth aspect. Details are not repeated herein again. Therefore, the provided communications apparatus can achieve same beneficial effects as any one of the thirteenth aspect or the possible designs of the thirteenth aspect.

According to a fifteenth aspect, a communications apparatus is provided. The communications apparatus includes a processor and a memory, where the memory is configured to store a computer-executable instruction; and when the communications apparatus runs, the processor executes the computer-executable instruction stored in the memory, so that the communications apparatus performs the V2X message transmission method according to any one of the thirteenth aspect or the possible designs of the thirteenth aspect.

According to a sixteenth aspect, a computer-readable storage medium is provided. The computer-readable storage medium stores an instruction; and when the instruction is run on a computer, the computer is enabled to perform the V2X message transmission method according to any one of the thirteenth aspect or the possible designs of the thirteenth aspect.

According to a seventeenth aspect, a computer program product including an instruction is provided. When the computer program product runs on a computer, the computer is enabled to perform the V2X message transmission method according to any one of the thirteenth aspect or the possible designs of the thirteenth aspect.

According to an eighteenth aspect, a chip system is provided. The chip system includes a processor and a communications interface, which are configured to support a communications apparatus in implementing functions in the foregoing aspect. For example, the processor obtains identification information that is of a first V2X message and that includes a service identifier of the first V2X message and/or a communication layer identifier of the first V2X message, filters the first V2X message into a first QoS flow based on the identification information of the first V2X message and at least one packet filter set, and sends the first V2X message by using the first QoS flow. In a possible design, the chip system further includes a memory, and the memory is configured to store a program instruction and data that are necessary for the communications apparatus. The chip system may include a chip, or may include a chip and another discrete component.

For technical effects achieved by any one of the designs of the fifteenth aspect to the eighteenth aspect, refer to technical effects achieved by any one of the thirteenth aspect or the possible designs of the thirteenth aspect. Details are not described again.

According to a nineteenth aspect, a V2X message transmission method is provided. The method includes: A V2XCF receives a first request used to request a V2X communications parameter, and sends the V2X communications parameter based on the first request, where the V2X communications parameter includes a packet filter set. According to the method in the nineteenth aspect, the V2XCF may configure a packet filter set for a terminal, so that the terminal may filter a V2X message into a QoS flow based on identification information of the V2X message and the packet filter set, and send the V2X message through a communications interface of the QoS flow, that is, send the V2X message at a granularity of a QoS flow, thereby meeting a QoS requirement of the V2X message.

In a possible design, with reference to the nineteenth aspect, the packet filter set includes identification information of a V2X message, and there is a correspondence relationship between a packet filter set and an identifier of a QoS flow. Based on this possible design, identification information of a V2X message may be included in a packet filter set, so that the terminal determines a packet filter set including identification information of a first V2X message, and filters the first V2X message into a QoS flow corresponding to the packet filter set.

In a possible design, with reference to any one of the nineteenth aspect or the possible designs of the nineteenth aspect, the method further includes: The V2XCF sends a third correspondence relationship to the terminal, where the third correspondence relationship is a correspondence relationship between a service identifier of a V2X message and a communication layer identifier of the V2X message.

In a possible design, with reference to any one of the nineteenth aspect or the possible designs of the nineteenth aspect, the method further includes: The V2XCF sends an association indication to the terminal, where the association indication is used to indicate the terminal to associate a communication layer identifier with a service identifier. Based on this possible design, the V2XCF may send an association indication to the terminal, to indicate the terminal to associate a service identifier of a V2X message with a communication layer identifier of the V2X message.

In a possible design, with reference to any one of the nineteenth aspect or the possible designs of the nineteenth aspect, the method further includes: The V2XCF generates a communication layer identifier of the V2X message, and sends the communication layer identifier of the V2X message to the terminal. Based on this possible design, the V2XCF may generate a communication layer identifier of a V2X message in real time. This is easy and convenient.

In a possible design, with reference to any one of the nineteenth aspect or the possible designs of the nineteenth aspect, the method further includes: The V2XCF receives a communication layer identifier of the V2X message from the terminal; and when the V2XCF determines to allow the terminal to use the communication layer identifier of the V2X message, the V2XCF sends a notification message to the terminal, where the notification message is used to indicate the terminal to use the communication layer identifier of the V2X message. Based on this possible design, after generating a communication layer identifier of a V2X message, the terminal may send the generated communication layer identifier of the V2X message to the V2XCF, and use the communication layer identifier after the V2XCF determines that the terminal can use the communication layer identifier. The V2XCF centrally controls and manages usage of communication layer identifiers of V2X messages by the terminal, to avoid a conflict in use of the communication layer identifiers of the V2X messages.

In a possible design, the notification message includes the communication layer identifier of the V2X message. Based on this possible design, after determining that the terminal can use a communication layer identifier of a specific V2X message, the V2XCF notifies the terminal of the communication layer identifier that is of the V2X message and that can be used.

In a possible design, the communication layer identifier of the V2X message includes one or more of a layer 2 identifier, an IP address, or a UDP port number.

According to a twentieth aspect, this application provides a communications apparatus. The communications apparatus may be a vehicle to everything control function, a chip in a vehicle to everything control function, or a system-on-a-chip. The communications apparatus may implement functions performed by the V2XCF in the nineteenth aspect or the possible designs of the nineteenth aspect, and the functions may be implemented by hardware, or may be implemented by hardware executing corresponding software. The hardware or the software includes one or more modules corresponding to the foregoing functions. For example, the communications apparatus may include a receiving unit and a sending unit.

The receiving unit is configured to receive a first request used to request a V2X communications parameter.

The sending unit is configured to send the V2X communications parameter based on the first request, where the V2X communications parameter includes a packet filter set.

For a specific implementation of the communications apparatus, refer to behaviors and functions of the V2XCF in the V2X message transmission method according to any one of the nineteenth aspect or the possible designs of the nineteenth aspect. Details are not repeated herein. Therefore, the provided communications apparatus can achieve same beneficial effects as any one of the nineteenth aspect or the possible designs of the nineteenth aspect.

According to a twenty-first aspect, a communications apparatus is provided. The communications apparatus includes a processor and a memory, where the memory is configured to store a computer-executable instruction; and when the communications apparatus runs, the processor executes the computer-executable instruction stored in the memory, so that the communications apparatus performs the V2X message transmission method according to any one of the nineteenth aspect or the possible designs of the nineteenth aspect.

According to a twenty-second aspect, a computer-readable storage medium is provided. The computer-readable storage medium stores an instruction; and when the instruction is run on a computer, the computer is enabled to perform the V2X message transmission method according to any one of the nineteenth aspect or the possible designs of the nineteenth aspect.

According to a twenty-third aspect, a computer program product including an instruction is provided. When the computer program product runs on a computer, the computer is enabled to perform the V2X message transmission method according to any one of the nineteenth aspect or the possible designs of the nineteenth aspect.

According to a twenty-fourth aspect, a chip system is provided. The chip system includes a processor and a communications interface, which are configured to support a communications apparatus in implementing functions in the foregoing aspect. For example, the processor receives a first request used to request a V2X communications parameter, and sends the V2X communications parameter based on the first request, where the V2X communications parameter includes a packet filter set. In a possible design, the chip system further includes a memory, and the memory is configured to store a program instruction and data that are necessary for the communications apparatus. The chip system may include a chip, or may include a chip and another discrete component.

For technical effects achieved by any one of the designs of the twenty-first aspect to the twenty-fourth aspect, refer to technical effects achieved by any one of the nineteenth aspect or the possible designs of the nineteenth aspect. Details are not described again.

According to a twenty-fifth aspect, a V2X message transmission system is provided. The system includes the terminal according to any one of the second aspect to the sixth aspect and the V2XCF according to any one of the eighth aspect to the twelfth aspect; or includes the terminal according to any one of the fourteenth aspect to the eighteenth aspect and the V2XCF according to any one of the twentieth aspect to the twenty-fourth aspect.

BRIEF DESCRIPTION OF DRAWINGS

FIG. 7b-1 and FIG. 7b-2 are a flowchart of still another V2X message transmission method according to an embodiment of this application:

DESCRIPTION OF EMBODIMENTS

The following describes implementations of the embodiments of this application in detail with reference to the accompanying drawings.

A method provided in the embodiments of this application may be used in any communications system supporting V2X message transmission. The communications system may be a 3rd generation partnership project (3GPP) communications system, for example, a long term evolution (LTE) system, a 5th generation (5G) mobile communications system, or a new radio (NR) system; or the communications system may be a non-3GPP communications system. This is not limited.

Figure 1:
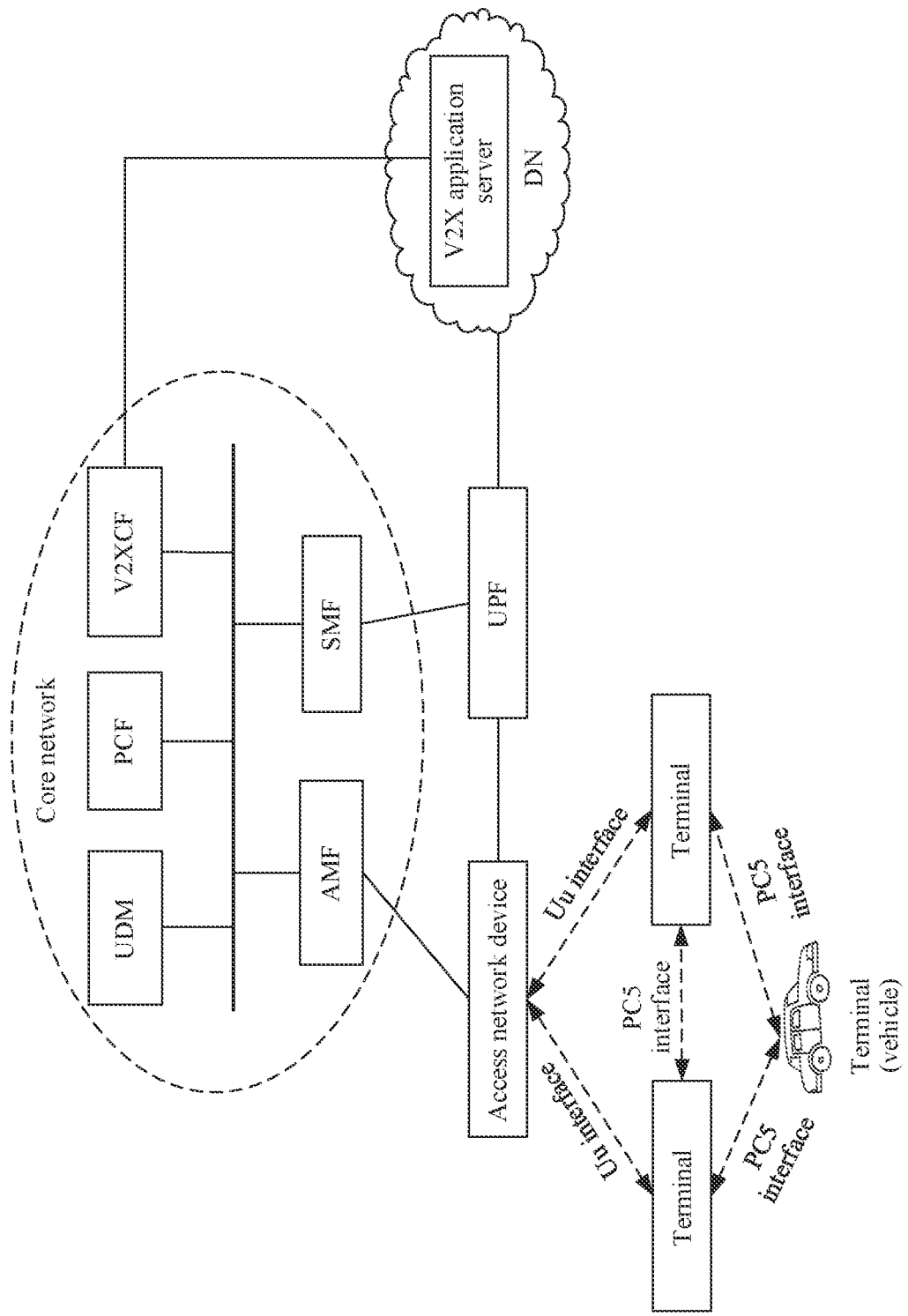
FIG. 1 is a simplified schematic diagram of a system architecture according to an embodiment of this application.

FIG. 1 is an architectural diagram of a communications system. The communications system may include a plurality of terminals, an access network device, an access and mobility management function (AMF), a V2X control function (V2XCF), a policy control function (PCF), unified data management (UDM), a session management function (SMF), a user plane function (UPF) entity, a data network (DN), and the like. The DN may include a V2X application server (APP server). The method provided in the embodiments of this application is mainly performed through interaction between the terminal and the V2XCF in FIG. 1. As shown in FIG. 1, the terminal may interact with the V2XCF through the access network device and the AMF.

The terminal in FIG. 1 may be referred to as user equipment (UE) or a terminal device (terminal), and may support V2X communication, for example, receive or send a V2X message. The V2X message may include but is not limited to a vehicle-to-vehicle V2V message, a V2P message, a V2N message, a V2I message, an anti-collision message between vehicles, an entertainment application message, a navigation message exchanged between vehicles, and the like. The terminal shown in FIG. 1 may include but is not limited to a vehicle-mounted terminal, a mobile phone, a tablet computer, a computer having a wireless transceiver function, a smart gas station, an intelligent traffic light, and the like. In the embodiments of this application, the terminal may transmit V2X messages through communications interfaces of different types. For the communications interface, refer to descriptions in the following method embodiments. For example, the communications interface may include a PC5 interface and/or a Uu interface.

It should be noted that the communications system shown in FIG. 1 is used as an example to describe the method provided in the embodiments of this application. This is not limited.

Figure 2A:
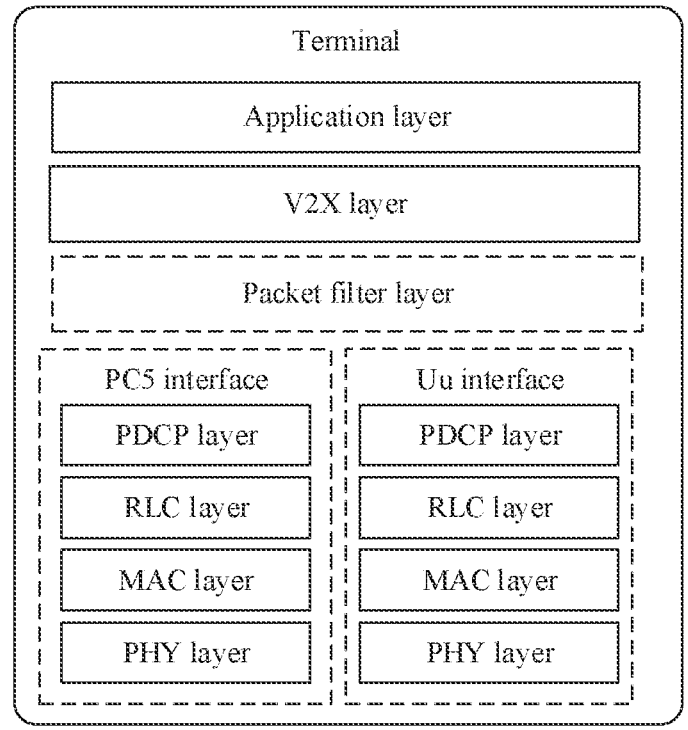
FIG. 2a is a schematic diagram of protocol layers of a terminal according to an embodiment of this application.

FIG. 2a is a schematic diagram of protocol layers of a terminal. The protocol layers may support the terminal in transmitting a V2X message. As shown in FIG. 2a, the protocol layers of the terminal may include an application layer, a V2X layer, a packet filter layer, a packet data convergence protocol (packet data convergence protocol, PDCP) layer, a radio link control (RLC) layer, a media access control (MAC) layer, and a physical layer (PHY layer).

The application layer is mainly used to provide a V2X service, for example, generate a V2X message.

The V2X layer is mainly used to determine a communications interface of the V2X message, and the like. The V2X layer may store a correspondence relationship between a service identifier and at least one communications interface. The V2X layer of the terminal may be independently deployed in the terminal, or may be deployed at another protocol layer of the terminal. For example, the V2X layer may be deployed at a non-access stratum (NAS) (not shown in FIG. 2a) of the terminal. When the V2X layer is deployed at the NAS, an action performed by the V2X layer may be considered as being performed by the NAS. This is not limited. In the embodiments of this application, an example in which the V2X layer of the terminal is independently deployed in the terminal is used for description. This is not limited.

The packet filter layer is mainly used to filter the V2X message into a proper QoS flow. The packet filter layer may store (or record) a packet filter set, a correspondence relationship between a quality of service flow (QoS flow, QF) and a communications interface, or the like.

Functions of the PDCP layer, the RLC layer, the MAC layer, and the PHY layer are the same as functions of a PDCP layer, an RLC layer, a MAC layer, and a PHY layer in the current technology. Details are not described. The PDCP layer, the RLC layer, the MAC layer, and the PHY layer may be combined to be referred to as a bottom layer of the terminal. The terminal may configure a bottom layer corresponding to a communications interface, and communications interfaces of different types correspond to different configurations of bottom layers. A V2X message may be sent through a communications interface after being processed by a bottom layer corresponding to the communications interface.

It should be noted that communications interfaces of different types may share a same PDCP layer, or may separately use different PDCP layers. This is not limited. In the embodiments of this application, an example in which communications interfaces of different types correspond to different PDCP layers is used for description.

In addition, FIG. 2a is merely an example accompanying drawing of protocol layers of the terminal. In addition to the protocol layers shown in FIG. 2a, the terminal may further include another protocol layer, for example, a service data adaptation protocol (SDAP) layer or a radio resource control (RRC) layer. The SDAP layer may be located between the V2X layer and the PDCP layer. The SDAP layer, the PDCP layer, the RLC layer, and the RRC layer may be collectively referred to as an access stratum (AS) of the terminal. In the following embodiments of this application, the packet filter layer may be the SDAP layer, the NAS, or the AS, or may be included in the SDAP layer, the NAS, or the AS, or may be the V2X layer or included in the V2X layer. The following uses only an example in which the packet filter layer is independently deployed in the terminal for description. The packet filter layer may be replaced with the V2X layer to perform an action performed by the packet filter layer. For example, the V2X layer may also be used to filter the V2X message into the corresponding QoS flow.

The V2XCF in FIG. 1 may be connected to another network element (for example, the AMF) in a core network through a communications interface or a service-oriented interface. The V2XCF is mainly configured to configure a V2X communications parameter for the terminal. For example, the V2XCF may determine the V2X communications parameter for the terminal based on a network resource deployment status, subscription and authorization information of the terminal, application information (for example, a feature and a QoS requirement of a V2X application) provided by the V2X application server, and other information. The feature and the QoS requirement of the V2X application may include but are not limited to a service type of the V2X application, a maximum bandwidth for transmitting the V2X application, a communications interface supporting transmission of the V2X application, a priority of a communications interface supporting transmission of the V2X application, or the like. The V2X communications parameter is generated based on the feature and the QoS requirement of the V2X application, and the V2X communications parameter is configured for the terminal. For descriptions of the V2X communications parameter, refer to descriptions in the following embodiments. The V2XCF may be independently deployed in the core network shown in FIG. 1, or may be integrated into the PCF. This is not limited. When the V2XCF is integrated into the PCF, a V2XCF in the following method embodiments may alternatively be replaced with a PCF. In the embodiments of this application, an example in which the V2XCF is independently deployed in the core network is used for description.

It should be noted that the network architecture shown in FIG. 1 is merely an example architecture, and a quantity of network elements included in the communications system shown in FIG. 1 is not limited in the embodiments of this application. Although not shown, in addition to the functional entities in a network shown in FIG. 1, the network shown in FIG. 1 may further include another functional entity. In addition, names of the network elements, interfaces between the network elements, and the protocol layers in the architecture shown in FIG. 1 are merely examples, and may be other names during specific implementation. This is not specifically limited in the embodiments of this application.

Figure 2B:
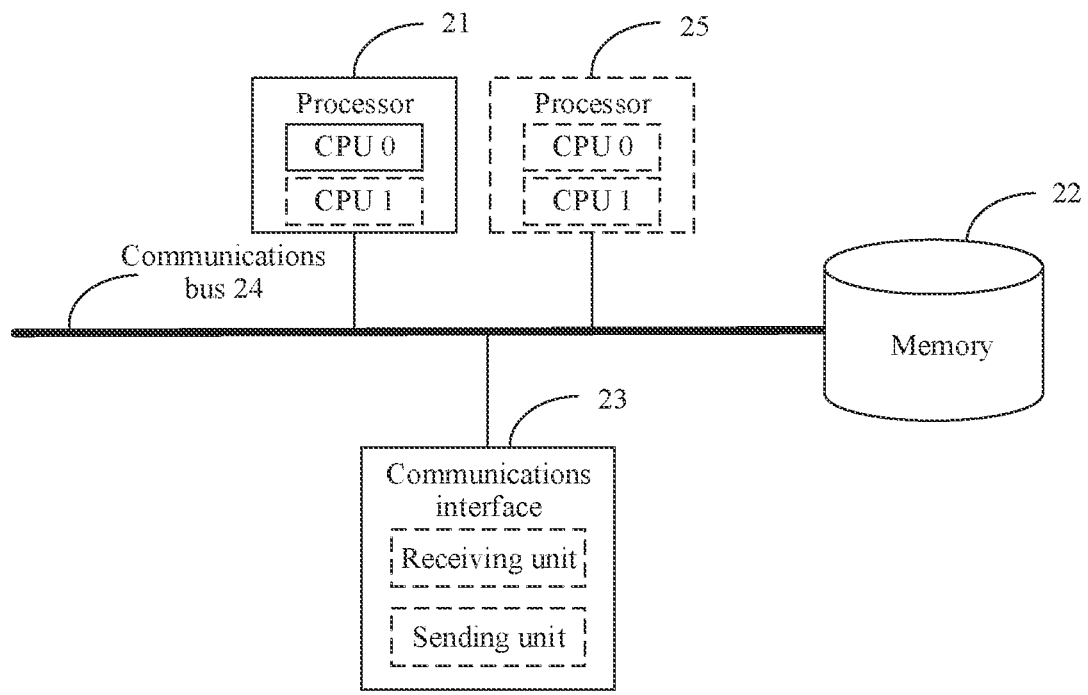
FIG. 2b is a schematic composition diagram of a communications apparatus according to an embodiment of this application.

During specific implementation, the terminal and the V2XCF that perform the embodiments of this application may be implemented by hardware shown in FIG. 2b or a combination of hardware and computer software. FIG. 2b is a schematic composition diagram of a communications apparatus according to an embodiment of this application. As shown in FIG. 2b, the communications apparatus may include at least one processor 21, a memory 22, a communications interface 23, and a communications bus 24. The following describes each component of the communications apparatus in detail with reference to FIG. 2b.

The processor 21 may be one processor or may be a collective term of a plurality of processing elements. For example, the processor 21 may be a central processing unit (CPU) or an application-specific integrated circuit (ASIC), or may be one or more integrated circuits configured to implement the embodiments of this application, for example, one or more microprocessors (DSP) or one or more field programmable gate arrays (field programmable gate array, FPGA).

The processor 21 may perform various functions of the communications apparatus by running or executing a software program stored in the memory 22 and invoking data stored in the memory 22. During specific implementation, in an embodiment, the processor 21 may include one or more CPUs, for example, a CPU 0 and a CPU 1 in FIG. 2b.

During specific implementation, in an embodiment, the communications apparatus may include a plurality of processors, for example, the processor 21 and a processor 25 in FIG. 2b. Each of the processors may be a single-core processor (single-CPU) or may be a multi-core processor (multi-CPU). The processor herein may refer to one or more devices, circuits, and/or processing cores configured to process data (for example, a computer program instruction).

The memory 22 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory 22 may exist independently, and is connected to the processor 21 through the communications bus 24. The memory 22 may alternatively be integrated with the processor 21. The memory 22 is configured to store a software program for performing the solutions of this application, and the processor 21 controls the execution.

The communications interface 23 is configured to communicate with another device or a communications network, such as the Ethernet, a radio access network (RAN), or a wireless local area network (WLAN) through any apparatus such as a transceiver. The communications interface 23 may include a receiving unit and a sending unit.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2b, but this does not mean that there is only one bus or only one type of bus.

It should be noted that the components shown in FIG. 2b do not constitute a limitation on the communications apparatus. In addition to the components shown in FIG. 2b, the communications apparatus may include more or fewer components than those shown in the figure, or some components may be combined, or different component arrangements may be used.

The following describes a V2X message transmission method provided in the embodiments of this application with reference to the communications system shown in FIG. 1. A terminal mentioned in the following method embodiments has the protocol layers shown in FIG. 2a, and a terminal and a V2XCF mentioned in the following method embodiments have the hardware shown in FIG. 2b. Details are not described again. It should be noted that in the following embodiments of this application, names of messages between network elements, names of parameters in messages, or the like are merely examples, and may be other names during specific implementation. This is not specifically limited in the embodiments of this application.

When any one of embodiments shown in FIG. 3 to FIG. 6 is performed (for example, before the embodiment is performed or in a process of performing the embodiment), some V2X communications parameters used for V2X message transmission may be configured (or stored) on the terminal.

In an example, the V2X communications parameter may be obtained by the terminal from the V2XCF, that is, configured by the V2XCF for the terminal. For example, the terminal may send, to an AMF, a registration request used to request network registration; after receiving the registration request, the AMF sends, to the V2XCF, a first request used to request a V2X communications parameter; after receiving the first request, the V2XCF obtains a V2X communications parameter, includes the V2X communications parameter in a response to the first request, and sends the response to the AMF; and after receiving the response to the first request, the AMF sends the V2X communications parameter to the terminal by using a NAS message (for example, a registration response corresponding to the registration request).

In another example, the V2XCF generates the V2X communications parameter, and actively sends the V2X communications parameter to an AMF; and the AMF includes the V2X communications parameter in a terminal configuration update (UE configuration update) message, and sends the terminal configuration update message to the terminal.

In another example, the terminal may obtain the V2X communications parameter from the V2XCF by using another NAS message. For example, the terminal may send an uplink NAS transmission message (UL NAS transport message) to an AMF, where the uplink NAS transmission message carries indication information used to indicate to request a V2X communications parameter; after receiving the uplink NAS transmission message, the AMF sends, to the V2XCF, a first request used to request a V2X communications parameter; after receiving the first request, the V2XCF obtains a V2X communications parameter, includes the V2X communications parameter in a response to the first request, and sends the response to the AMF; and after receiving the response to the first request, the AMF includes the V2X communications parameter in a terminal configuration update (UE configuration update) message, and sends the terminal configuration update message to the terminal.

In the embodiments of this application, the V2X communications parameter may include but is not limited to a correspondence relationship between a V2X application and a service identifier, a correspondence relationship between a service identifier of a V2X message and an encapsulation mode of the V2X message, a correspondence relationship (which may be named as a first correspondence relationship in the embodiments of this application) between a service identifier of a V2X message and at least one communications interface, a packet filter set corresponding to an identifier of a QoS flow, or a correspondence relationship (which may be named as a second correspondence relationship in the embodiments of this application) between an identifier of a QoS flow and a communications interface. The V2X communications parameter may further include a correspondence relationship (which may be named as a third correspondence relationship in the embodiments of this application) between a service identifier of a V2X message and a communication layer identifier of the V2X message, another parameter, or the like. For example, the V2X communications parameter may further include a public land mobile network (PLMN), geographical position information, working time information, or a used spectrum of a terminal that is authorized to perform V2X communication.

A service identifier (service identity, service ID) of a V2X message may also be referred to as a service identifier or a V2X service ID. The service identifier of the V2X message may be used to identify a V2X application to which the V2X message belongs, for example, may be an application layer identifier of the V2X message. The service identifier of the V2X message may include a symbol of any form of a letter, a Chinese character, a digit, or a special character. Service identifiers of V2X messages of different V2X applications may be different, and service identifiers of V2X messages of a same V2X application may be the same.

An encapsulation mode of a V2X message may include two modes: internet protocol (IP) encapsulation and non-IP encapsulation. The IP encapsulation may be: A V2X message is encapsulated together with an IP address and/or a user datagram protocol (UDP) port number, or a V2X message and a layer 2 identifier of the V2X message are encapsulated with an IP address and/or a UDP port number. The non-IP encapsulation may be: A V2X message is encapsulated together with a layer 2 identifier.

A communications interface may include a PC5 interface and/or a Uu interface. The PC5 interface and the Uu interface may support different radio access technologies (radio access technology, RAT). For example, the RAT may include an LTE technology or an NR technology. A PC5 interface supporting the LTE technology may be referred to as an LTE PC5 interface, and a PC5 interface supporting the NR technology may be referred to as an NR PC5 interface. A Uu interface supporting the LTE technology may be referred to as an LTE Uu interface, and a Uu interface supporting the NR technology may be referred to as an NR Uu interface.

In the embodiments of this application, when the PC5 interface and the Uu interface support different RATs, that a communications interface of a V2X message is a PC5 interface and/or a Uu interface may be: A communications interface of a V2X message is any one or more communications interfaces of an LTE PC5 interface, an NR PC5 interface, an LTE Uu interface, or an NR Uu interface. This is not limited. The following describes the V2X message transmission method provided in the embodiments of this application by using an example in which a communications interface of a V2X message is a PC5 interface and/or a Uu interface.

It should be noted that, in the embodiments of this application, names of the communications interfaces are merely examples for description. The PC5 interface and the Uu interface may alternatively be named as other interfaces. For example, the PC5 interface may alternatively be named as a sidelink interface, and the Uu interface may alternatively be named as an NR interface. The communications interface includes but is not limited to the PC5 interface or the Uu interface, and may further include another interface that subsequently emerges with development of communications technologies.

An identifier of a QoS flow is used to identify the QoS flow, and may be a service flow identifier (QoS flow identifier, QFI) or a fifth generation service identifier (5th generation QoS flow identity, 5QI).

A packet filter set may include identification information of a V2X message, other information, and the like. There is a correspondence relationship between a packet filter set and an identifier of a QoS flow. For example, one packet filter set may include identification information of one or more V2X messages, different packet filter sets include different identification information of V2X messages, and different packet filter sets may correspond to different QoS flow identifiers.

It should be noted that, in the embodiments of this application, it is not limited that the identification information of the V2X message is included in the packet filter set, but the identifier of the QoS flow directly corresponds to the identification information of the V2X message. For example, a packet filter set 1 may include {service ID 1, service ID 2, service ID 3}, and the packet filter set 1 corresponds to a QFI 1, or the service ID 1, the service ID 2, and the service ID 3 correspond to a QFI 1.

Identification information of a V2X message may include a service identifier of the V2X message and/or a communication layer identifier of the V2X message.

A communication layer identifier of a V2X message may include one or more of a layer 2 (L2) identifier, an IP address, or a UDP port number. The communication layer identifier of the V2X message may be used to identify one or more of a terminal, a V2X communication connection, or a V2X application to which the V2X message belongs. Communication layer identifiers used to identify different V2X communication connections and/or different V2X applications and/or different terminals cannot be the same, and so on.

For example, when an encapsulation mode of the V2X message is non-P encapsulation, the communication layer identifier of the V2X message may include an L2 identifier. When the encapsulation mode of the V2X message is IP encapsulation, the communication layer identifier of the V2X message may include an IP address and/or a UDP port number, or may include a layer 2 identifier and at least one or more of the following: an IP address and/or a UDP port number.

The V2X communication connection may be a one-to-one connection between a local terminal and a peer terminal, or may be a one-to-many connection between a terminal and a group, where the group may include two or more peer terminals.

In the embodiments of this application, the IP address may include a source IP address and/or a destination IP address, and the UDP port number may include a source UDP port number and/or a destination UDP port number. The layer 2 identifier may include a source layer 2 identifier and/or a destination layer 2 identifier. The destination IP address and/or the destination UDP port number may be used to identify a V2X service application; or the destination IP address and/or the destination UDP port number may be used to identify a communication connection. The source layer 2 identifier and/or the destination layer 2 identifier may be used to identify a communication connection.

Figure 3:
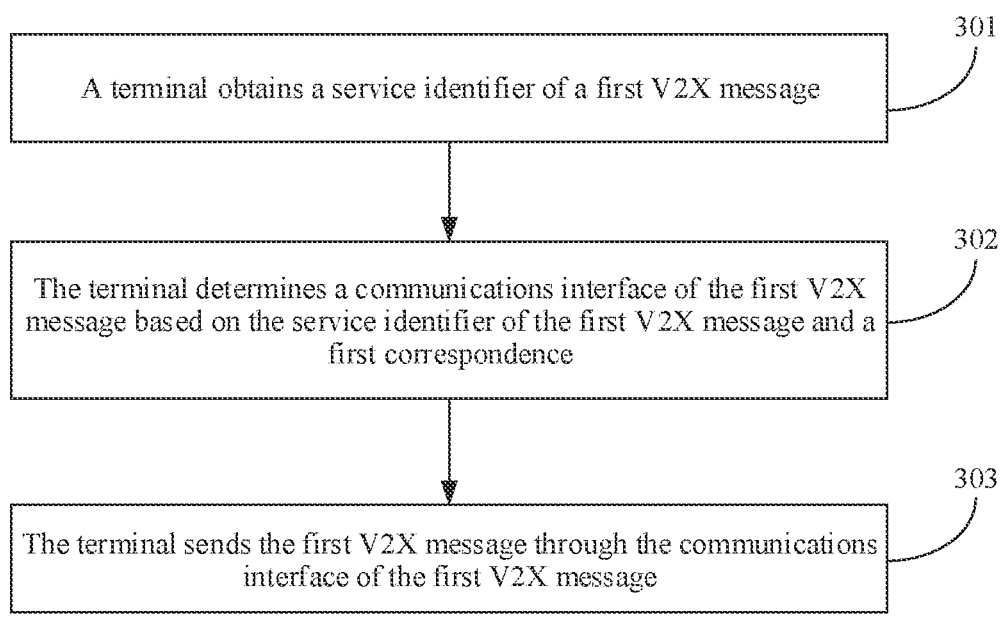
FIG. 3 is a flowchart of a V2X message transmission method according to an embodiment of this application.

FIG. 3 is a flowchart of a V2X message transmission method according to an embodiment of this application. As shown in FIG. 3, the method may include the following steps.

Step 301: A terminal obtains a service identifier of a first V2X message.

The terminal may be any one of the terminals in FIG. 1.

The first V2X message may be a V2X message that is generated by an application laver of the terminal and that belongs to any V2X application. For example, the first V2X message may be a message generated by the application layer of the terminal, such as a V2I message, a V2P message, an anti-collision message between vehicles, an entertainment application message, or a navigation message exchanged between vehicles.

For related descriptions of the service identifier of the first V2X message, refer to related descriptions of the service identifier of the V2X message before step 301. Details are not described.

In an example, the terminal may determine the service identifier of the first V2X message based on a V2X service application to which the first V2X message belongs and a correspondence relationship between a V2X service application and a service identifier.

Step 302: The terminal determines a communications interface of the first V2X message based on the service identifier of the first V2X message and a first correspondence relationship.

The first correspondence relationship may be a correspondence relationship between a service identifier of a V2X message and at least one communications interface. As described before step 301, the first correspondence relationship may be obtained by the terminal from a V2XCF or obtained in another manner. This is not limited.

In an example, the terminal may perform matching between the service identifier of the first V2X message and a service identifier, of a V2X message, included in the first correspondence relationship, to find a first correspondence relationship including the service identifier of the first V2X message, and determine at least one communications interface corresponding to the service identifier of the first V2X message in the found first correspondence relationship.

When the at least one communications interface corresponding to the service identifier of the first V2X message includes at least two communications interfaces (two or more communications interfaces), a communications interface with a higher priority in the at least two communications interfaces is used as the communications interface of the first V2X message; or all the communications interfaces corresponding to the service identifier of the first V2X message are used as the communications interface of the first V2X message to transmit the first V2X message through the two or more communications interfaces.

When the at least one communications interface corresponding to the service identifier of the first V2X message includes one communications interface, the communications interface corresponding to the service identifier of the first V2X message is used as the communications interface of the first V2X message.

A priority (priority level) of a communications interface may be correspondingly stored in the terminal with the communications interface. For example, the priority of the communications interface may be included in the first correspondence relationship. Different communications interfaces correspond to different priorities. A higher priority of the communications interface indicates a higher possibility of transmitting a V2X message through the communications interface, and a lower priority of the communications interface indicates a lower possibility of transmitting the V2X message through the communications interface. A number or the like may be used to represent the priority of the communications interface. A larger number indicates a higher priority, or a smaller number indicates a higher priority. This is not limited.

That a communications interface with a higher priority in the at least two communications interfaces is used as the communications interface of the first V2X message may include the following two cases.

Case 1: A communications interface with a highest priority in the at least two communications interfaces is used as the communications interface of the first V2X message based on priorities of the communications interfaces.

Case 2: if a communications interface with a highest priority cannot meet a transmission requirement of the first V2X message, a communications interface with a second highest priority in the at least two communications interfaces is used as the communications interface of the first V2X message.

That the communications interface cannot meet the transmission requirement of the first V2X message may include one or more of the following cases: The communications interface is unavailable (or the terminal is not allowed to access and use the communications interface) in a specific area and/or in a specific time period; or spectrum resources of the communications interface are insufficient, for example, a quantity of available time domain resources and/or frequency domain resources on the communications interface is less than a preset threshold; or signal quality of the communications interface cannot meet a QoS requirement of the first V2X message, for example, cannot meet a latency requirement or a rate requirement of the first V2X message.

For example, the following Table 1 is a table of a correspondence relationship between a service identifier and at least one communications interface. As shown in Table 1, a service ID 1 corresponds to a PC5 interface; a service ID 2 corresponds to a Uu interface; a service ID 3 corresponds to a PC5 interface or a Uu interface, where a priority of the PC5 interface is higher than a priority of the Uu interface; and a service ID 4 corresponds to a PC5 interface and a Uu interface. It is assumed that a service identifier of a V2X message 1 generated by the terminal is the service ID 1. In this case, by using the service ID 1 as an index, it can be learned from Table 1 that a communications interface corresponding to the service ID 1 is the PC5 interface, indicating that the V2X message 1 identified by the service ID 1 can be transmitted only through the PC5 interface, and then it is determined that a communications interface of the V2X message 1 is the PC5 interface. It is assumed that a service identifier of a V2X message 3 generated by the terminal is the service ID 3. In this case, by using the service ID 3 as an index, it can be learned from Table 1 that a communications interface corresponding to the service ID 3 is the PC5 interface or the Uu interface, indicating that the V2X message 3 identified by the service ID 3 can be transmitted through the PC5 interface or the Uu interface, and then the terminal may compare the priorities of the PC5 interface and the Uu interface, and use the PC5 interface with a higher priority as a communications interface of the V2X message 3. It is assumed that a service identifier of a V2X message 4 generated by the terminal is the service ID 4. In this case, by using the service ID 4 as an index, it can be learned from Table 1 that communications interfaces corresponding to the service ID 4 are the PC5 interface and the Uu interface, and the terminal may use the PC5 interface and the Uu interface as communications interfaces of the V2X message 4, and transmit the V2X message 4 through the PC5 interface and the Uu interface.

TABLE 1

| Service identifier | Communications interface |
| --- | --- |
| Service ID 1 | PC5 interface |
| Service ID 2 | Uu interface |
| Service ID 3 | PC5 interface or Uu interface |
| Service ID 4 | PC5 interface and Uu interface |

Step 303: The terminal sends the first V2X message through the communications interface of the first V2X message.

In an example, the application layer of the terminal sends the first V2X message to a bottom layer, of the terminal, corresponding to the communications interface, and the bottom layer of the terminal processes the first V2X message and sends the first V2X message through the communications interface of the first V2X message.

For a manner of processing the first V2X message by the bottom layer of the terminal, refer to the current technology. Details are not described again.

In another example, the terminal may obtain identification information of the first V2X message, filter the first V2X message into a first QoS flow based on the identification information of the first V2X message and a packet filter set, and send the first V2X message through a communications interface of the first QoS flow.

The communications interface of the first QoS flow is the same as the communications interface of the first V2X message. Specifically, for a manner of sending the first V2X message through the communications interface of the first QoS flow, refer to descriptions in an embodiment corresponding to FIG. 5.

According to the method shown in FIG. 3, the terminal may determine at least one communications interface corresponding to the service identifier of the first V2X message generated by the terminal based on the correspondence relationship between a service identifier of a V2X message and at least one communications interface, select a proper communications interface in the at least one communications interface corresponding to the service identifier of the first V2X message as the communications interface of the first V2X message, and send the first V2X message through the communications interface of the first V2X message. In this way, a communications interface of a V2X message may be determined based on the preconfigured correspondence relationship between a service identifier of a V2X message and at least one communications interface, and the application layer of the terminal does not need to autonomously select a communications interface for transmitting the V2X message, so that a problem that the V2X message cannot be sent through the communications interface selected by the application layer of the terminal is avoided, or a problem that a QoS requirement of the V2X message cannot be met when the V2X message is sent through the communications interface selected by the application layer of the terminal is avoided.

Optionally, in the embodiments of this application, the first correspondence relationship may be dynamically updated. For example, when the terminal supports two or more communications interfaces including a first communications interface and a second communications interface in transmitting a V2X message, if the terminal determines, based on the first correspondence relationship, that a communications interface of the V2X message is the first communications interface, and it is found that a QoS requirement of the V2X message cannot be met when the V2X message is transmitted through the first communications interface, the terminal may determine to transmit the V2X message through another communications interface (for example, the second communications interface), and update the first communications interface, in the first correspondence relationship, corresponding to a service identifier of the V2X message to the another communications interface.

For example, a communications interface corresponding to a service identifier 1 in the first correspondence relationship is a PC5 interface, and subsequently, when it is found that a QoS requirement cannot be met when a V2X message identified by the service identifier 1 is transmitted through the PC5 interface, the communications interface (the PC5 interface) corresponding to the service identifier 1 in the first correspondence relationship is updated to a Uu interface.

Optionally, in the method shown in FIG. 3, step 301, step 302, and step 303 may be performed by a V2X layer of the terminal. For example, the V2X layer of the terminal obtains the service identifier of the first V2X message, determines the communications interface of the first V2X message based on the service identifier of the first V2X message and the first correspondence relationship, and sends the first V2X message through the communications interface of the first V2X message.

The V2X layer of the terminal may obtain the service identifier of the first V2X message from the application layer of the terminal. For example, after generating the first V2X message, the application layer of the terminal determines the service identifier of the first V2X message based on the V2X service application to which the first V2X message belongs and the correspondence relationship between a V2X service application and a service identifier, includes the first V2X message and the service identifier of the first V2X message in an application layer protocol data unit (PDU), and sends the application layer protocol data unit to the V2X layer of the terminal; and after receiving the application layer PDU, the V2X layer of the terminal obtains the service identifier of the first V2X message from the application layer PDU.

Figure 4:
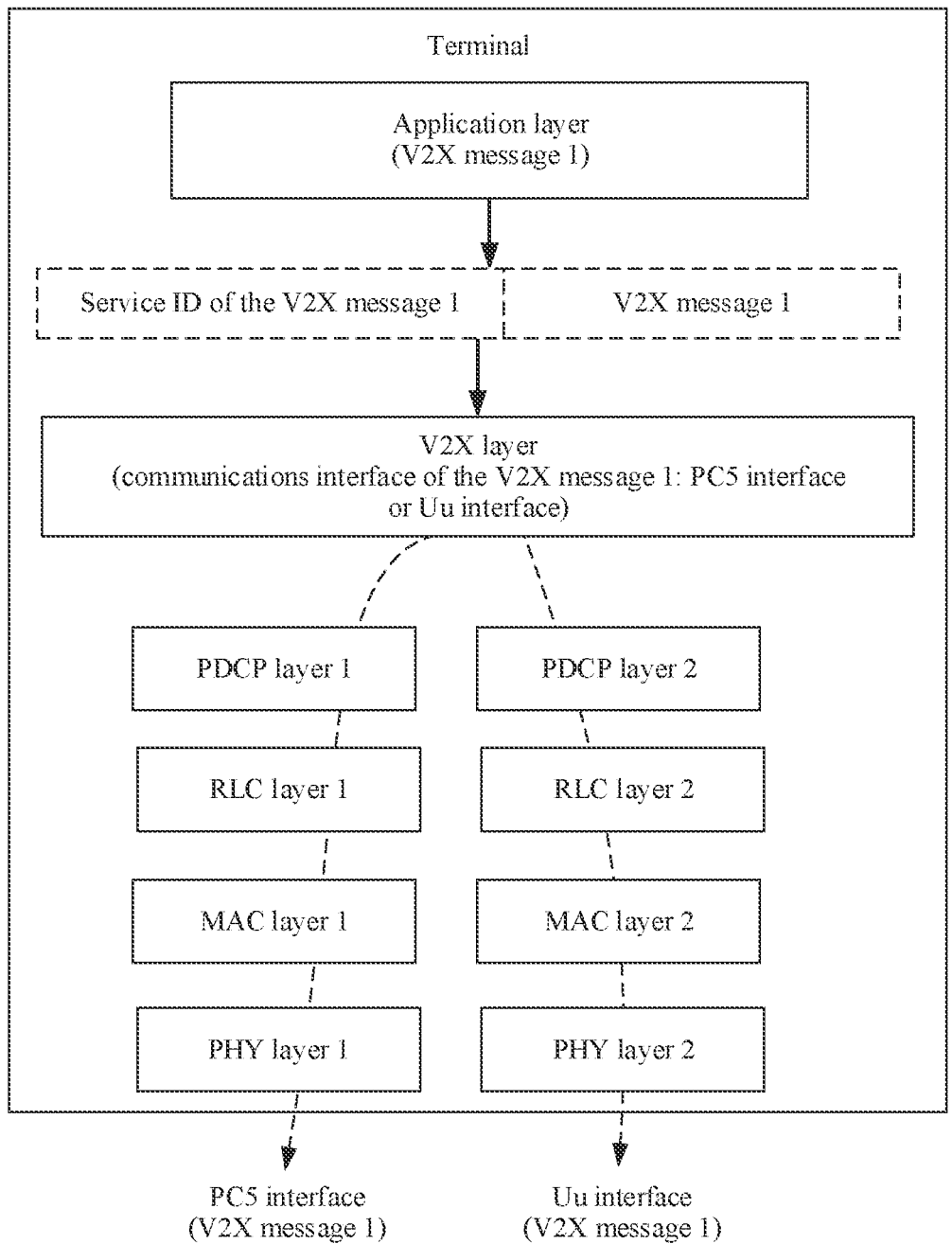
FIG. 4 is a flowchart of transmitting a V2X message through a communications interface of the V2X message according to an embodiment of this application.

As shown in FIG. 4, a bottom layer, of the terminal, corresponding to a PC5 interface may include a PDCP layer 1, an RLC layer 1, a MAC layer 1, and a PHY layer 1 of the terminal, and a bottom layer, of the terminal, corresponding to a Uu interface may include a PDCP layer 2, an RLC layer 2, a MAC layer 2, and a PHY layer 2 of the terminal.

For example, after generating a V2X message 1, the application layer of the terminal may include the V2X message 1 and a service ID of the V2X message 1 in an application layer PDU and send the application layer PDU to the V2X layer of the terminal.

The V2X layer of the terminal receives the application layer PDU, obtains the service ID of the V2X message 1 from the application layer PDU, and determines, based on the service ID of the V2X message 1 and the first correspondence relationship, that a communications interface of the V2X message 1 is a PC5 interface or a Uu interface. If the communications interface is the PC5 interface, the V2X layer of the terminal sends the V2X message 1 to the PDCP layer 1, the RLC layer 1, the MAC layer 1, and the PHY layer 1 of the terminal for processing, and sends the processed V2X message 1 through the PC5 interface. If the communications interface is the Uu interface, the V2X layer of the terminal sends the V2X message 1 to the PDCP layer 2, the RLC layer 2, the MAC layer 2, and the PHY layer 2 of the terminal for processing, and sends the processed V2X message 1 through the Uu interface.

It should be noted that, in this embodiment of this application, it is not limited that step 301 to step 303 are performed by the V2X layer. In addition to the V2X layer, step 301 to step 303 may alternatively be performed by another protocol layer. For example, step 301 to step 303 may be performed by the application layer of the terminal. This is not limited.

The following describes the V2X message transmission method provided in the embodiments of this application by using an example in which a V2X message is filtered into a QoS flow and sent by using the QoS flow.

Figure 5:
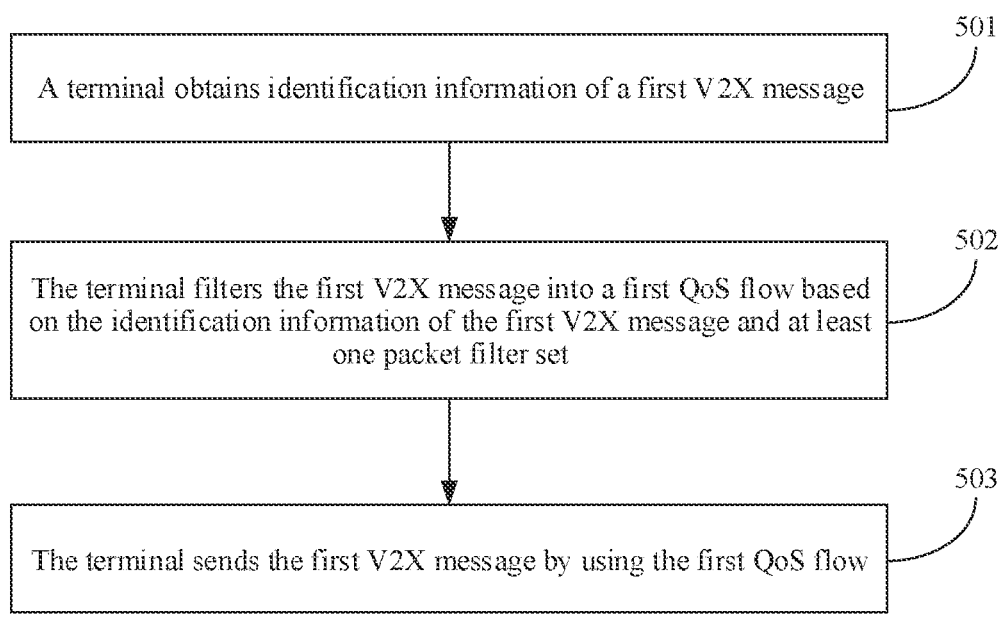
FIG. 5 is a flowchart of another V2X message transmission method according to an embodiment of this application.

FIG. 5 shows another V2X message transmission method according to an embodiment of this application. As shown in FIG. 5, the method includes the following steps.

Step 501: A terminal obtains identification information of a first V2X message.

The terminal may be any one of the terminals in FIG. 1. The identification information of the first V2X message may include a service identifier of the first V2X message and/or a communication layer identifier of the first V2X message.

For related descriptions of the service identifier of the first V2X message, refer to related descriptions of the service identifier of the V2X message before step 301. The terminal may obtain the service identifier of the first V2X message in the manner in step 301. Details are not described again.

For related descriptions of the communication layer identifier of the first V2X message, refer to related descriptions of the communication layer identifier of the V2X message before step 301. The terminal may obtain the communication layer identifier of the first V2X message in any one of the following manner 1 to manner 3.

Manner 1: The terminal determines the communication layer identifier of the first V2X message based on the service identifier of the first V2X message and a third correspondence relationship. For example, the terminal may perform matching between the service identifier of the first V2X message and a service identifier, of a V2X message, included in the third correspondence relationship, to find a third correspondence relationship including the service identifier of the first V2X message, and use a communication layer identifier corresponding to the service identifier of the first V2X message in the found third correspondence relationship as the communication layer identifier of the first V2X message.

For example, the following Table 2 shows a correspondence relationship between a service identifier of a V2X message and a communication layer identifier of the V2X message. As described in Table 2, a service ID 1 corresponds to a layer 2 identifier 1, and a service ID 2 corresponds to a layer 2 identifier 2. It is assumed that a service identifier of a V2X message 1 received by a V2X layer of the terminal from an application layer of the terminal is the service ID 1. In this case, by using the service ID 1 as an index, it can be learned from the following Table 2 that a communication layer identifier of the V2X message 1 is the layer 2 identifier 1.

TABLE 2

| Service identifier of a V2X message | Communication layer identifier of the V2X message |
|---|---|
| Service ID 1 | Layer 2 identifier 1 |
| Service ID 2 | Layer 2 identifier 2 |

In an example, the third correspondence relationship may be obtained by the terminal from a V2XCF, as described before step 301.

For example, the V2XCF may randomly generate an identifier as a communication layer identifier of a V2X message; map the generated communication layer identifier of the V2X message to a service identifier of the V2X message, to form a third correspondence relationship; and send the generated third correspondence relationship to the terminal. Alternatively, the terminal randomly generates an identifier as a communication layer identifier of a V2X message and sends the generated communication layer identifier of the V2X message to the V2XCF through an AMF; and after receiving the communication layer identifier of the V2X message, the V2XCF maps the received communication layer identifier of the V2X message to a service identifier of the V2X message, to form a third correspondence relationship, and sends the generated third correspondence relationship to the terminal.

In another example, the third correspondence relationship may be generated by the terminal.

For example, the terminal may send a communication layer identifier of a V2X message to the V2XCF, and the V2XCF receives the communication layer identifier of the V2X message and determines whether the terminal can associate the communication layer identifier of the V2X message with a service identifier of the V2X message. If determining that the terminal can associate the communication layer identifier of the V2X message with the service identifier of the V2X message, the V2XCF sends, to the terminal, an association indication used to indicate the terminal to associate the communication layer identifier of the V2X message with the service identifier of the V2X message; and after receiving the association indication, the terminal generates a third correspondence relationship based on the association indication.

If the V2XCF finds that the communication layer identifier, sent by the terminal, of the V2X message has not been used by the terminal, the V2XCF determines that the terminal can associate the communication layer identifier of the V2X message with the service identifier of the V2X message. Otherwise, the V2XCF determines that the terminal cannot associate the communication layer identifier of the V2X message with the service identifier of the V2X message.

Manner 2: The V2XCF generates a communication layer identifier of a V2X message and sends the communication layer identifier of the V2X message to the terminal; and the terminal receives the communication layer identifier, sent by the V2XCF, of the V2X message.

The communication layer identifier, sent by the V2XCF, of the V2X message may include the communication layer identifier of the first V2X message.

Manner 3: The terminal generates a communication layer identifier of a V2X message.

The communication layer identifier, generated by the terminal, of the V2X message may include the communication layer identifier of the first V2X message.

In manner 3, to avoid a conflict in use of communication layer identifiers, after generating the communication layer identifier of the V2X message, the terminal may send the communication layer identifier of the V2X message to the V2XCF; and after receiving the communication layer identifier, sent by the terminal, of the V2X message, the V2XCF determines whether to allow the terminal to use the communication layer identifier of the V2X message, and sends a notification message to the terminal if determining to allow the terminal to use the communication layer identifier of the V2X message.

If the V2XCF finds that the communication layer identifier, sent by the terminal, of the V2X message has not been used by the terminal, the V2XCF allows the terminal to use the communication layer identifier of the V2X message. Otherwise, the V2XCF does not allow the terminal to use the communication layer identifier of the V2X message.

The notification message may be used to indicate the terminal to use the communication layer identifier of the V2X message. The notification message may include the communication layer identifier of the V2X message.

Step 502: The terminal filters the first V2X message into a first QoS flow based on the identification information of the first V2X message and at least one packet filter set.

For related descriptions of the packet filter set, refer to the descriptions before step 301. Details are not described again.

In an example, that the terminal filters the first V2X message into a first QoS flow based on the identification information of the first V2X message and at least one packet filter set may include: determining, based on a correspondence relationship between a packet filter set and an identifier of a QoS flow, an identifier, of a QoS flow, corresponding to a first packet filter set, where the first packet filter set is a packet filter set that is in the at least one packet filter set and that includes the identification information of the first V2X message; and filtering the first V2X message into the first QoS flow based on the determined identifier of the QoS flow.

For example, a QFI 1 corresponds to a packet filter set 1 {service ID 1, service ID 2, service ID 3}, and a QFI 2 corresponds to a packet filter set 2 {service ID 4, service ID 5}. It is assumed that the terminal obtains identification information of a V2X message 1: the service ID 1, and performs identification matching between the service ID 1 and identification information included in the at least one packet filter set, to find that the service ID 1 matches the identification information in the packet filter set 1, where the packet filter set 1 corresponds to the QFI 1. In this case, the terminal filters the V2X message 1 into a QoS flow 1 identified by the QFI 1.

Step 503: The terminal sends the first V2X message by using the first QoS flow.

That the terminal sends the first V2X message by using the first QoS flow may include: The terminal sends the first V2X message through a communications interface of the first QoS flow.

The communications interface of the first QoS flow may be the same as a communications interface of the first V2X message.

In an example, the terminal may determine the communications interface of the first V2X message in the manner in step 302, and use the communications interface of the first V2X message as the communications interface of the first QoS flow.

In another example, the terminal may determine the communications interface of the first QoS flow based on a second correspondence relationship and an identifier of the first QoS flow.

The second correspondence relationship is a correspondence relationship between an identifier of a QoS flow and a communications interface. For related descriptions of the second correspondence relationship, refer to the descriptions before step 301. Details are not described again.

For example, the following Table 3 is a table of a correspondence relationship between an identifier of a QoS flow and a communications interface. As shown in Table 3, a QFI 1 corresponds to a PC5 interface, a QFI 2 corresponds to a Uu interface, and a QFI 3 corresponds to a PC5 interface. It is assumed that the terminal determines to filter a V2X message 1 into a QF 1. In this case, by using the identifier QFI 1 of the QF 1 as an index, it can be learned from Table 3 that a communications interface corresponding to the QFI 1 is the PC5 interface, and the V2X message 1 is sent through the PC5 interface corresponding to the QFI 1.

TABLE 3

| Identifier of a QoS flow | Communications interface |
| --- | --- |
| QFI 1 | PC5 interface |
| QFI 2 | Uu interface |
| QFI 3 | PC5 interface |

According to the method shown in FIG. 5, the terminal may filter a V2X message generated by the terminal into a specific QoS flow based on an identifier of the V2X message and at least one packet filter set, and send the V2X message through a communications interface of the QoS flow, that is, send the V2X message at a transmission granularity of a QoS flow, for example, send the V2X message through the communications interface of the QoS flow. This avoids a problem, caused by the application layer of the terminal autonomously selecting a communications interface for transmitting the V2X message, that the V2X message cannot be sent through the communications interface selected by the application layer of the terminal or that a QoS requirement of the V2X message cannot be met when the V2X message is sent through the communications interface selected by the application layer of the terminal.

Optionally, in the method shown in FIG. 5, to ensure that the first V2X message is filtered into the first QoS flow, and the communications interface of the first QoS flow is the same as the communications interface of the first V2X message, the first correspondence relationship, the second correspondence relationship, and the at least one packet filter set configured by the V2XCF for the terminal meet the following requirements: A communications interface corresponding to the service identifier of the first V2X message in the first correspondence relationship is the same as the communications interface corresponding to the identifier of the first QoS flow in the second correspondence relationship, and a packet filter set corresponding to the identifier of the first QoS flow includes the identification information of the first V2X message.

For example, it is assumed that a communications interface of a V2X message 1 is a PC5 interface, a service identifier of the V2X message 1 is a service ID 1, and a packet filter set corresponding to a QFI 1 includes the service ID 1 and a service ID 2. In this case, to ensure that a communications interface of a QoS flow corresponding to the V2X message 1 is the same as the communications interface of the V2X message 1, a communications interface corresponding to the QFI 1 in the second correspondence relationship is the PC5 interface, instead of a Uu interface or another communications interface.

Optionally, in the method shown in FIG. 5, step 501 is performed by the V2X layer of the terminal, and step 502 and step 503 are performed by a packet filter layer of the terminal. For example, the V2X layer of the terminal obtains the identification information of the first V2X message, the V2X layer of the terminal sends the identification information of the first V2X message to the packet filter layer of the terminal;

the packet filter layer of the terminal receives the identification information of the first V2X message, and filters the first V2X message into the first QoS flow based on the identification information of the first V2X message and the at least one packet filter set; and the packet filter layer of the terminal sends the first V2X message by using the first QoS flow.

It should be noted that, in this application, it is not limited that step 501 is performed by the application layer of the terminal, and step 502 and step 503 are performed by the V2X layer of the terminal. Step 501, step 502, or step 503 may alternatively be performed by another protocol layer of the terminal. This is not limited.

It should be noted that, in this embodiment of this application, the at least one packet filter set configured on the terminal may include but is not limited to one type of packet filter set including identification information of a V2X message (for ease of description, a packet filter set including an identification information of a V2X message may be referred to as a first-type packet filter set), and another type of packet filter set may alternatively be configured. For example, a packet filter set (which may be referred to as a second-type packet filter set) including 5-tuple information (for example, one or more of a protocol version number, a source IP address, a destination IP address, a source UDP port number, or a destination UDP port number) of a V2X message may alternatively be configured.

A QoS flow corresponding to the second-type packet filter set is different from a QoS flow corresponding to the first-type packet filter set, and a communications interface of the QoS flow corresponding to the second-type packet filter set is different from a communications interface of the QoS flow corresponding to the first-type packet filter set.

In an example, the communications interface of the QoS flow corresponding to the first-type packet filter set may be a PC5 interface, and the communications interface of the QoS flow corresponding to the second-type packet filter set may be a Uu interface.

In this example, before performing step 501, the terminal may determine the communications interface of the first V2X message in the manner in step 302. If the communications interface of the first V2X message is the PC5 interface, the terminal may obtain the identification information of the first V2X message, query a first-type packet filter set by using the identification information of the first V2X message as an index, and filter the first V2X message into a QoS flow corresponding to the first-type packet filter set.

If the communications interface of the first V2X message is the Uu interface, the terminal may obtain 5-tuple information of the first V2X message, query a second-type packet filter set by using the 5-tuple information of the first V2X message as an index, and filter the first V2X message into a QoS flow corresponding to the second-type packet filter set.

The 5-tuple information of the first V2X message may be configured on the terminal, or the terminal may obtain the 5-tuple information of the first V2X message from the V2XCF.

In this way, when performing QoS flow filtering on a V2X message, the terminal may query a part of specific packet filter sets based on identification information of the V2X message or 5-tuple information of the V2X message, and does not need to sequentially query all packet filter sets, thereby reducing filtering complexity.

It may be understood that when the identification information of the V2X message includes a communication layer identifier of the V2X message, and the communication layer identifier of the V2X message includes an IP address and/or a UDP port number, because the IP address and/or the UDP port number of the V2X message are/is similar to the 5-tuple information of the V2X message, all the packet filter sets may be sequentially queried based on the IP address and/or the UDP port number of the V2X message; or the second-type packet filter set is preferentially queried, and then the first-type packet filter set is queried; or the first-type packet filter set is preferentially queried, and then the second-type packet filter set is queried.

Figure 6:
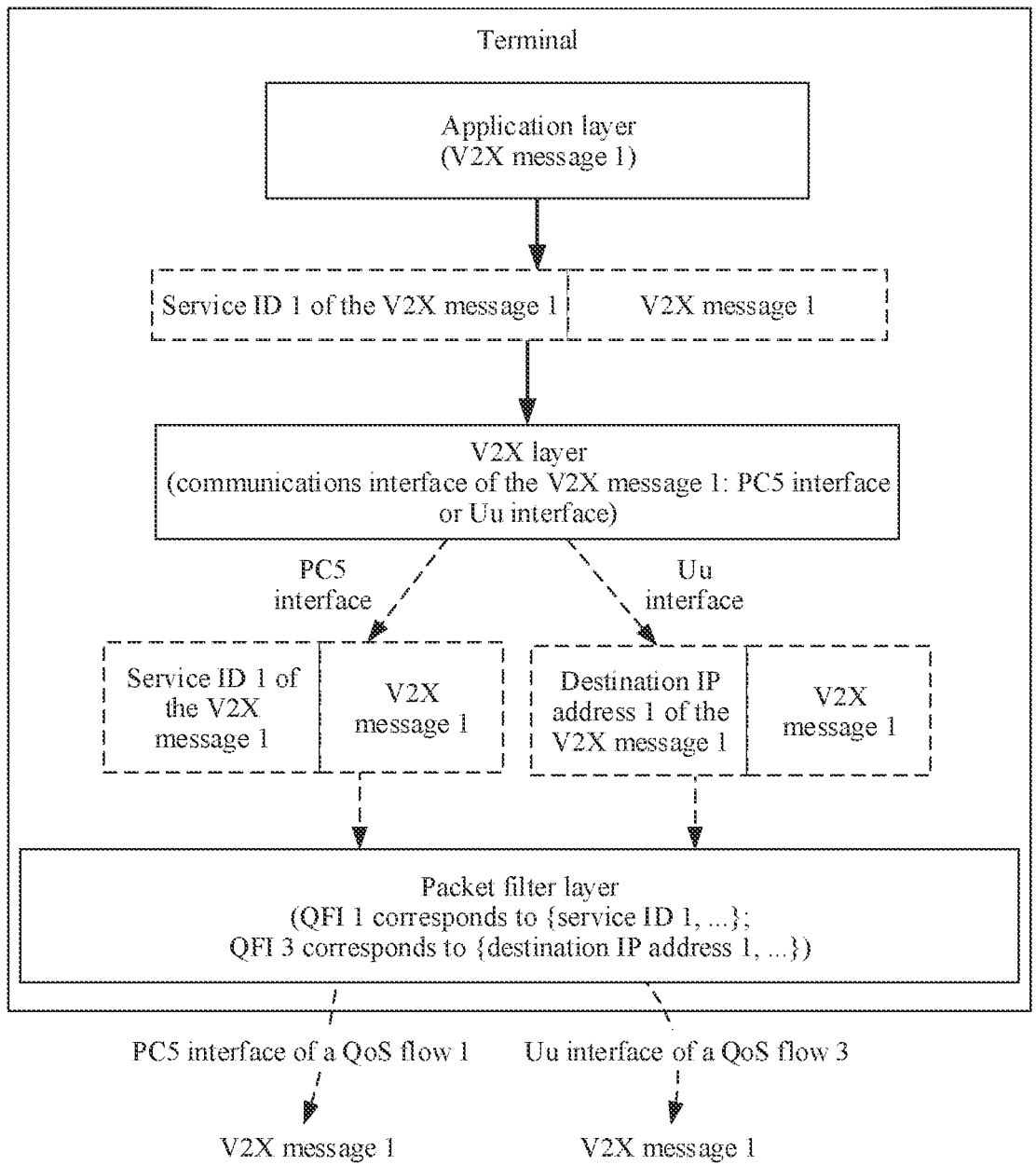
FIG. 6 is a flowchart of transmitting a V2X message through a communications interface of a QoS flow according to an embodiment of this application.

For example, as shown in FIG. 6, it is assumed that an identifier of a QoS flow 1 is a QFI 1, the QFI 1 corresponds to a packet filter set 1 {service ID 1, service ID 2, service ID 3}, an identifier of a QoS flow 2 is a QFI 2, the QFI 2 corresponds to a packet filter set 2 {service ID 4, service ID 5}, an identifier of a QoS flow 3 is a QFI 3, the QFI 3 corresponds to a packet filter set 3 (destination IP address 1, destination IP address 2), the QFI 1 and the QFI 2 each correspond to a PC5 interface, and the QFI 3 corresponds to a Uu interface. After generating a V2X message 1, the application layer of the terminal may include the V2X message 1 and a service ID 1 of the V2X message 1 in an application layer PDU and send the application layer PDU to the V2X layer of the terminal; and the V2X layer of the terminal receives the application layer PDU, obtains the service ID 1 of the V2X message 1 from the application layer PDU, and determines, based on the service ID 1 of the V2X message 1 and a correspondence relationship between a service identifier and at least one communications interface, that a communications interface of the V2X message 1 is a PC5 interface or a Uu interface.

If the communications interface is the PC5 interface, the V2X layer of the terminal may include the service ID 1 of the V2X message 1 and the V2X message 1 in a V2X layer PDU and send the V2X layer PDU to the packet filter layer of the terminal. After receiving the V2X layer PDU, the packet filter layer of the terminal obtains the service ID 1 of the V2X message 1 from the V2X layer PDU, and performs matching between the service ID 1 and the packet filter sets 1 and 2, to find that the service ID 1 of the V2X message 1 is included in the packet filter set 1. In this case, the V2X message 1 is filtered into the QoS flow 1, and the V2X message 1 is sent through the PC5 interface of the QoS flow 1.

If the communications interface is the Uu interface, the V2X layer of the terminal obtains a destination IP address 1 of the V2X message 1, includes the destination IP address 1 of the V2X message 1 and the V2X message 1 in a V2X layer PDU, and sends the V2X layer PDU to the packet filter layer of the terminal. After receiving the V2X layer PDU, the packet filter layer of the terminal obtains the destination IP address 1 of the V2X message 1 from the V2X layer PDU, and performs matching between the destination IP address 1 and the packet filter set 3, to find that the destination IP address 1 of the V2X message 1 is included in the packet filter set 3. In this case, the V2X message 1 is filtered into the QoS flow 3, and the V2X message 1 is sent through the Uu interface of the QoS flow 3.

Figure 7A:
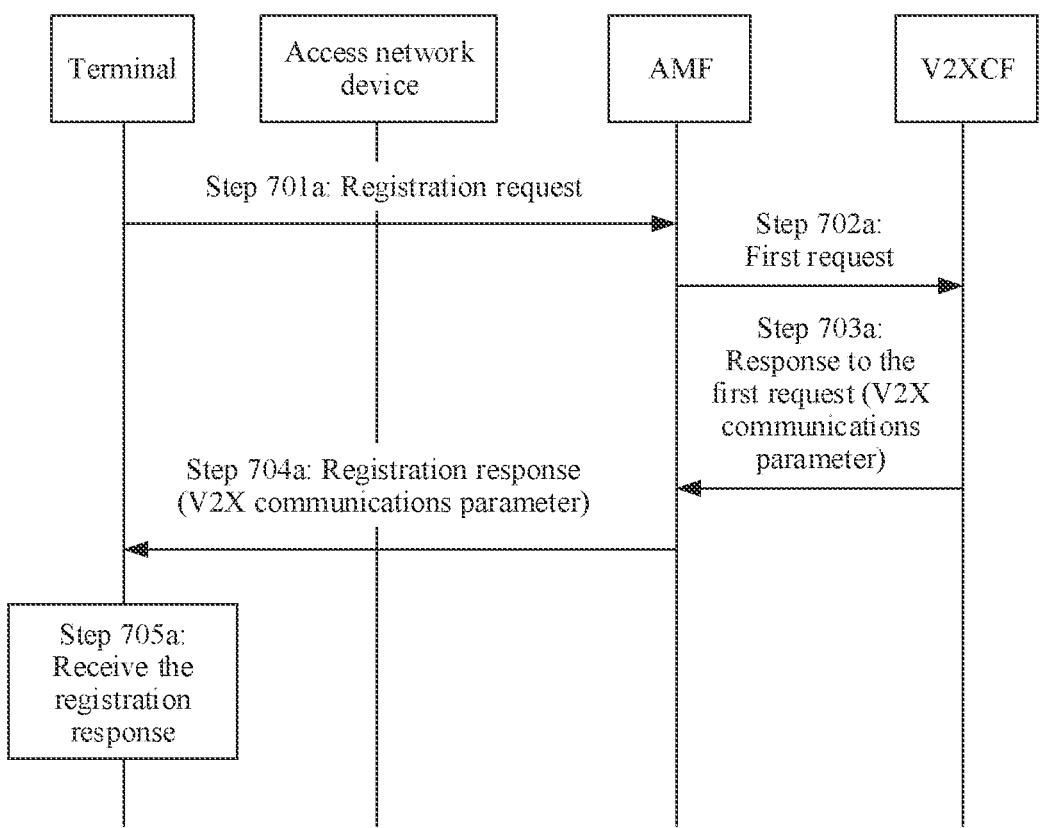
FIG. 7a is a flowchart of another V2X message transmission method according to an embodiment of this application.
Figures 1, 7B:
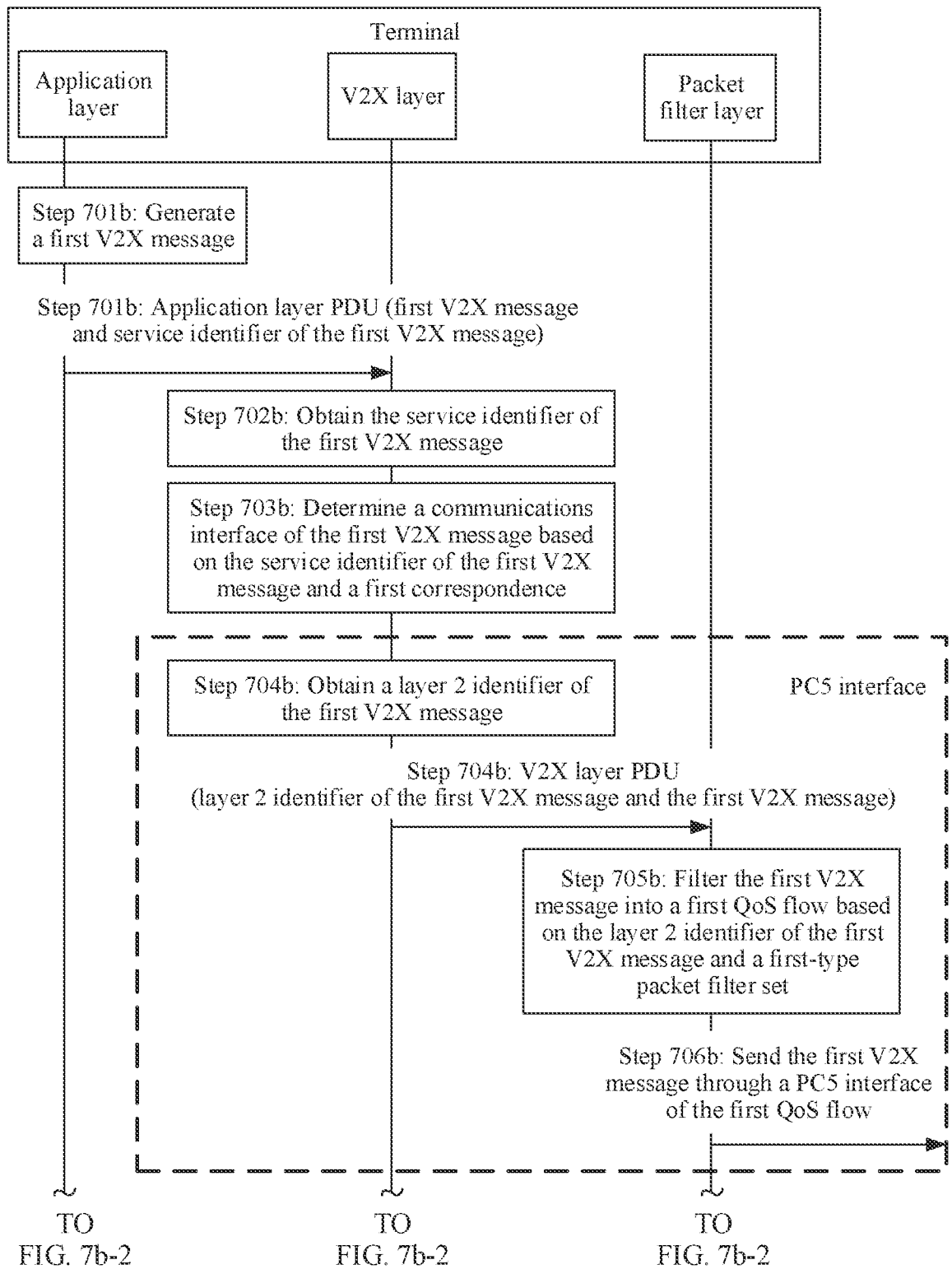
Figures 2, 7B:
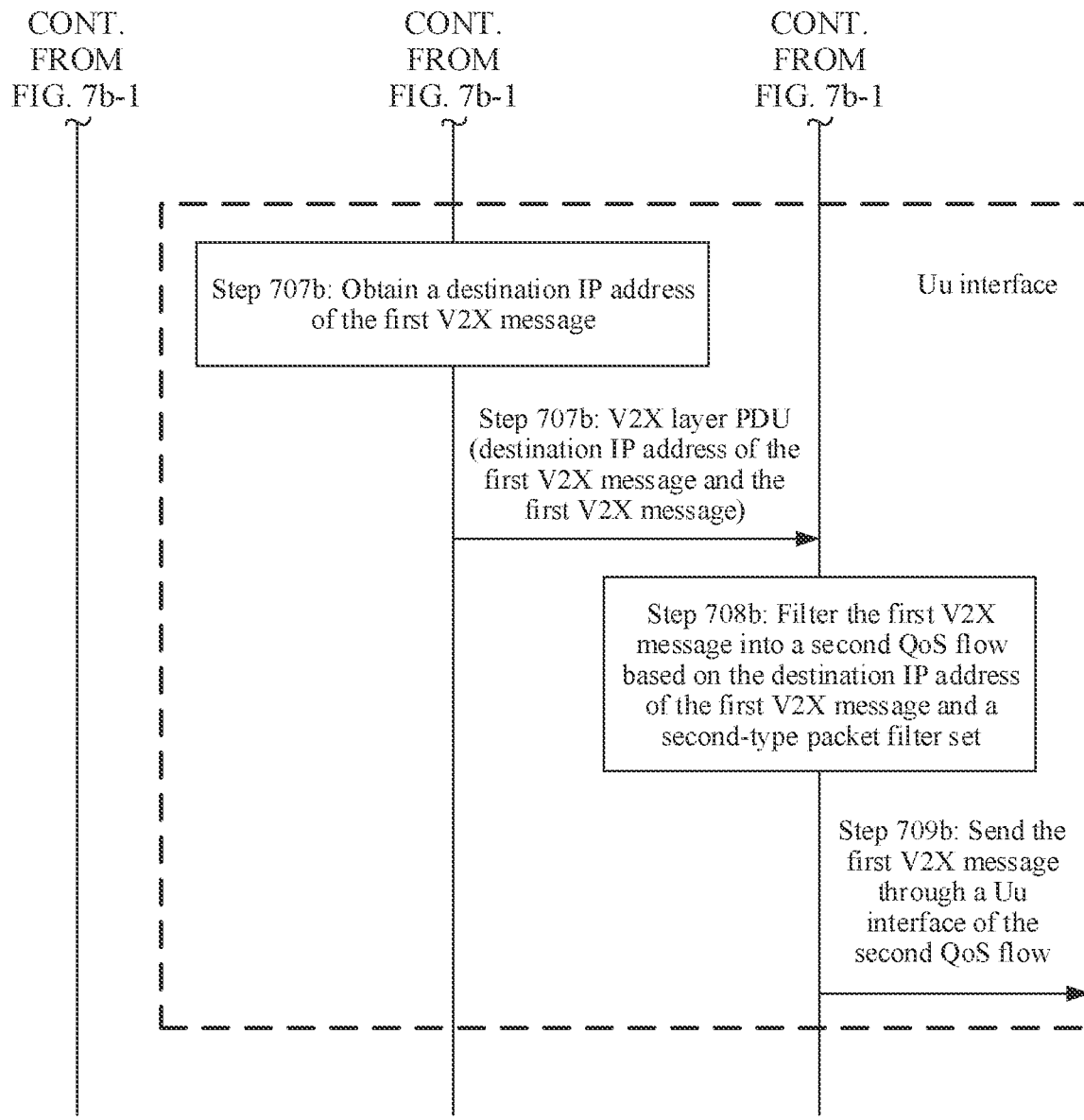

With reference to FIG. 7a to FIG. 7b-2, the following describes in detail a method for sending a V2X message by using a QoS flow by using an example in which a first-type packet filter set including a layer 2 identifier and a second-type packet filter set including a destination IP address are configured on the terminal, the identification information of the first V2X message includes the layer 2 identifier of the first V2X message, the 5-tuple information of the first V2X message includes a destination IP address of the first V2X message, the V2X layer of the terminal determines the communications interface of the first V2X message, and the packet filter layer of the terminal filters the first V2X message into a QoS flow.

FIG. 7a shows another V2X message transmission method according to an embodiment of this application. As shown in FIG. 7a, the method includes the following steps.

Step 701a: A terminal sends a registration request to an AMF.

The registration request is NAS signaling, and may be used to request network registration of the terminal.

For example, the terminal may send the registration request to the AMF through an access network device, or the terminal may directly send the registration request to the AMF.

Step 702a: The AMF receives the registration request, and sends a first request to a V2XCF.

As described above, the first request may be used to request a V2X communications parameter.

The V2X communications parameter is as that described before step 301. Details are not described again.

Step 703a: The V2XCF receives the first request, and sends, to the AMF, a response to the first request.

The response to the first request may include the V2X communications parameter.

Step 704a: The AMF receives the response to the first request, and sends a registration response to the terminal.

The registration response corresponds to the registration request sent by the terminal, and the registration response may include the V2X communications parameter.

Step 705a: The terminal receives the registration response.

After receiving the registration response, the terminal may store the V2X communications parameter in the registration response in the terminal.

For example, a first correspondence relationship and a third correspondence relationship may be stored in a V2X layer of the terminal, and a first-type packet filter set, a second-type packet filter set, and a second correspondence relationship are stored in a packet filter layer of the terminal.

Subsequently, the terminal may send any generated V2X message (for example, a first V2X message) through a communications interface of a QoS flow based on the V2X communications parameter included in the registration response.

In an example, the first V2X message is sent through the communications interface of the QoS flow. FIG. 7b-1 and FIG. 7b-2 show a process of sending a first V2X message through a communications interface of a QoS flow. As shown in FIG. 7b-1 and FIG. 7b-2, the process may include the following steps.

Step 701b: An application layer of a terminal generates a first V2X message, and sends the first V2X message and a service identifier of the first V2X message to a V2X layer of the terminal.

In an example, the first V2X message and the service identifier of the first V2X message may be included in an application layer PDU and sent to the V2X layer of the terminal. For example, the application layer PDU may include an application layer header and a payload, where the application layer header may include the service identifier of the first V2X message, and the payload may include the first V2X message.

In another example, the first V2X message is included in an application layer PDU, the service identifier of the first V2X message is not included in the application layer PDU, and the application layer PDU may be sent to the V2X layer of the terminal together with the service identifier of the first V2X message, or the application layer PDU and the service identifier of the first V2X message may be sent to the V2X layer of the terminal sequentially. This is not limited.

Step 702b: The V2X layer of the terminal receives the first V2X message and the service identifier of the first V2X message.

Step 703b: The V2X layer of the terminal determines a communications interface of the first V2X message based on the service identifier of the first V2X message and a first correspondence relationship. If the communications interface of the first V2X message is a PC5 interface, step 704b to step 706b are performed. If the communications interface of the first V2X message is a Uu interface, step 707b to step 709b are performed.

For step 703b, refer to the description of step 302. Details are not described again.

Step 704b: The V2X layer of the terminal obtains a layer 2 identifier of the first V2X message, includes the layer 2 identifier of the first V2X message and the first V2X message in a V2X layer PDU, and sends the V2X layer PDU to a packet filter layer of the terminal.

For a manner of obtaining the layer 2 identifier of the first V2X message by the V2X layer of the terminal, refer to the manner of obtaining the communication layer identifier of the first V2X message by the terminal in step 501. Details are not described again.

The V2X layer PDU may include a V2X layer header and a payload. The V2X layer header may include the layer 2 identifier of the first V2X message, and the payload may include the first V2X message.

Step 705b: The packet filter layer of the terminal receives the V2X layer PDU, obtains the layer 2 identifier of the first V2X message from the V2X layer PDU, and filters the first V2X message into a first QoS flow based on the layer 2 identifier of the first V2X message and a first-type packet filter set.

Specifically, for step 705b, refer to the description of step 502. Details are not described again.

Step 706b: The packet filter layer of the terminal sends the first V2X message through a PC5 interface of the first QoS flow.

Specifically, for step 706b, refer to the description of step 503. Details are not described again.

Step 707b: The V2X layer of the terminal obtains a destination IP address of the first V2X message, includes the destination IP address of the first V2X message and the first V2X message in a V2X layer PDU, and sends the V2X layer PDU to a packet filter layer of the terminal.

The V2X layer PDU may include a V2X layer header and a payload. The V2X layer header may include the destination IP address of the first V2X message, and the payload may include the first V2X message.

Step 708b: The packet filter layer of the terminal receives the V2X layer PDU, obtains the destination IP address of the first V2X message from the V2X layer PDU, and filters the first V2X message into a second QoS flow based on the destination IP address of the first V2X message and a second-type packet filter set.

Specifically, for step 708b, refer to the description of step 502. Details are not described again.

Step 709b: The packet filter layer of the terminal sends the first V2X message through a Uu interface of the second QoS flow.

Specifically, for step 706b, refer to the description of step 503. Details are not described again.

According to the methods shown in FIG. 7a to FIG. 7b-2, the terminal may receive the V2X communications parameter from the V2XCF, that is, a network side configures a part of V2X communications parameters for the terminal. Subsequently, after generating a V2X message, the terminal may filter the V2X message into a QoS flow based on the received V2X communications parameter, and transmit the V2X message through a communications interface of the QoS flow. In this way, the QoS flow corresponding to the V2X message may be selected based on a configuration of the network side, and the V2X message is transmitted through the communications interface of the determined QoS flow. This avoids a problem, caused by the application layer of the terminal autonomously selecting a communications interface for transmitting the V2X message, that the V2X message cannot be sent through the communications interface selected by the application layer of the terminal or that a QoS requirement of the V2X message cannot be met when the V2X message is sent through the communications interface selected by the application layer of the terminal.

The foregoing mainly describes the solutions provided in the embodiments of this application from a perspective of interaction between the network elements. It may be understood that to implement the foregoing functions, each network element, such as the terminal and the V2XCF, includes a corresponding hardware structure and/or software module that is used to perform each function. A person skilled in the art should easily be aware that, in combination with algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal and the V2XCF may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that, in the embodiments of this application, module division is an example, and is merely logical function division. During actual implementation, another division manner may be used.

Figure 8:
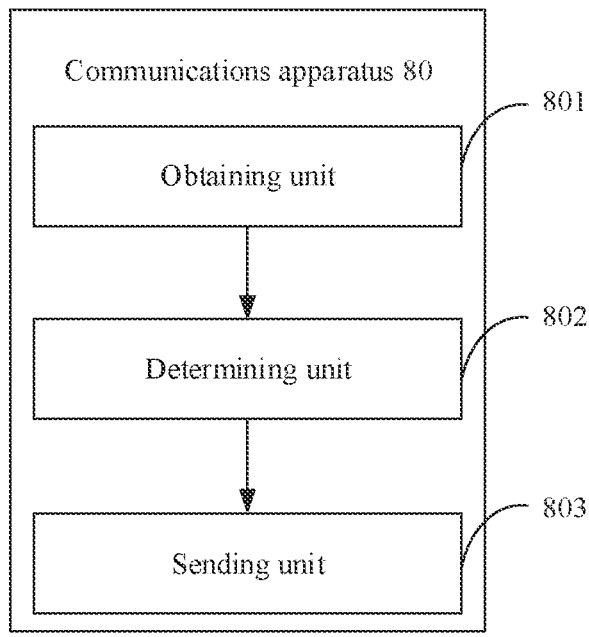
FIG. 8 is a schematic composition diagram of a communications apparatus 80 according to an embodiment of this application.

FIG. 8 is a schematic composition diagram of a communications apparatus 80 according to an embodiment of this application. The communications apparatus 80 may be a terminal, a chip in a terminal, or a system-on-a-chip. As shown in FIG. 8, the communications apparatus 80 may include an obtaining unit 801, a determining unit 802, and a sending unit 803.

In a possible design, the obtaining unit 801 is configured to obtain a service identifier of a first V2X message. For example, the obtaining unit 801 is configured to support the communications apparatus 80 in performing step 301.

The determining unit 802 is configured to determine a communications interface of the first V2X message based on the service identifier of the first V2X message and a first correspondence relationship, where the first correspondence relationship is a correspondence relationship between a service identifier of a V2X message and at least one communications interface. For example, the determining unit 802 is configured to support the communications apparatus 80 in performing step 302.

The sending unit 803 is configured to send the first V2X message through the communications interface of the first V2X message. For example, the sending unit 803 is configured to support the communications apparatus 80 in performing step 303.

In another possible design, the obtaining unit 801 is configured to obtain identification information of a first V2X message, where the identification information of the first V2X message includes a service identifier of the first V2X message and/or a communication layer identifier of the first V2X message. For example, the obtaining unit 801 is configured to support the communications apparatus 80 in performing step 501.

The determining unit 802 is configured to filter the first V2X message into a first QoS flow based on the identification information of the first V2X message and at least one packet filter set. For example, the determining unit 802 is configured to support the communications apparatus 80 in performing step 502.

The sending unit 803 is configured to send the first V2X message by using the first QoS flow. For example, the sending unit 803 is configured to support the communications apparatus 80 in performing step 503.

It should be noted that all related content of the steps in the foregoing method embodiments may be cited in function descriptions of corresponding function modules. Details are not described again herein. The communications apparatus 80 provided in this embodiment of this application is configured to perform functions of the terminal in the V2X message transmission method shown in FIG. 3 or FIG. 5, and therefore can achieve a same effect as the V2X message transmission method.

In another possible implementation, the communications apparatus 80 shown in FIG. 8 may include a processing module and a communications module. The processing module may integrate functions of the determining unit 802, and the communications module may integrate functions of the obtaining unit 801 and the sending unit 803. The processing module is configured to control and manage an action of the communications apparatus 80. For example, the processing module is configured to support the communications apparatus 80 in performing step 302, step 502, and another process of the technology described in this specification. The communications module is configured to support the communications apparatus 80 in performing step 301, step 303, step 501, and step 503 and in communicating with another network entity. Further, the communications apparatus 80 shown in FIG. 8 may further include a storage module, configured to store program code and data of the communications apparatus 80.

The processing module may be a processor or a controller. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 80 shown in FIG. 8 may be the communications apparatus shown in FIG. 2b.

Figure 9:
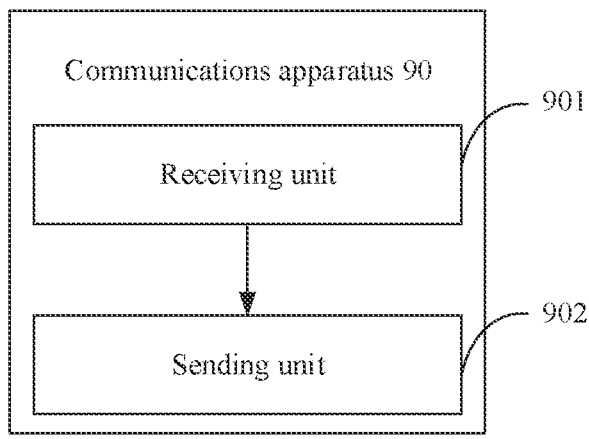
FIG. 9 is a schematic composition diagram of a communications apparatus 90 according to an embodiment of this application.

FIG. 9 is a schematic composition diagram of a communications apparatus 90 according to an embodiment of this application. The communications apparatus 90 may be a V2XCF, a chip in a V2XCF, or a system-on-a-chip. As shown in FIG. 9, the communications apparatus 90 may include a receiving unit 901 and a sending unit 902.

In a possible design, the receiving unit 901 is configured to receive a first request, where the first request is used to request a V2X communications parameter.

The sending unit 902 is configured to send the V2X communications parameter based on the first request, where the V2X communications parameter includes a correspondence relationship between a service identifier and at least one communications interface.

In another possible design, the receiving unit 901 is configured to receive a first request, where the first request is used to request a V2X communications parameter.

The sending unit 902 is configured to send the V2X communications parameter based on the first request, where the V2X communications parameter includes a packet filter set, and the packet filter set is used to filter a first V2X message generated by a terminal into a first quality of service flow QoS flow.

The correspondence relationship between a service identifier and at least one communications interface and the packet filter set may be included in the V2X communications parameter and sent to the terminal. For related descriptions of the V2X communications parameter, refer to descriptions in the foregoing method embodiments. It should be noted that all related content of the steps in the foregoing method embodiments may be cited in function descriptions of corresponding function modules. Details are not described again herein. The communications apparatus 90 provided in this embodiment of this application is configured to perform functions of the V2XCF in the V2X message transmission method shown in FIG. 3, FIG. 5, FIG. 7a, or FIGS. 7b-1 and 7b-2, and therefore can achieve a same effect as the V2X message transmission method.

In another possible implementation, the communications apparatus 90 shown in FIG. 9 may include a processing module and a communications module. The communications module may integrate functions of the receiving unit 901 and the sending unit 902. The processing module is configured to control and manage an action of the communications apparatus 90. For example, the processing module is configured to support the communications apparatus 90 in performing another process of the technology described in this specification. The communications module is configured to support the communications apparatus 90 in performing step 602 and in communicating with another network entity. Further, the communications apparatus 90 shown in FIG. 9 may further include a storage module, configured to store program code and data of the communications apparatus 90.

The processing module may be a processor or a controller. The processor or the controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a transceiver circuit, a communications interface, or the like. The storage module may be a memory. When the processing module is the processor, the communications module is the communications interface, and the storage module is the memory, the communications apparatus 90 shown in FIG. 9 may be the communications apparatus shown in FIG. 2b.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, and may be located at one place, or may be distributed on different places. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
    determining, by a terminal device identification information of a first vehicle to everything (V2X) message, wherein the identification information of the first V2X message comprises at least one of a service identifier of the first V2X message or a communication layer identifier of the first V2X message;
    determining, by the terminal device, a first identifier identifying a first quality of service (QoS) flow based on the identification information of the first V2X message and at least one packet filter set; and
    sending, by the terminal device the first V2X message by using the first QoS flow.

2. The method according to claim 1, wherein the at least one packet filter set comprises identification information of one or more V2X messages.

3. The method according to claim 2, wherein determining the first identifier identifying the first QoS flow comprises:
    determining, by the terminal device based on a correspondence relationship between a packet filter set and an identifier of a QoS flow, the first identifier corresponding to a first packet filter set, wherein the first packet filter set is in the at least one packet filter set and comprises the identification information of the first V2X message.

4. The method according to claim 1, wherein the identification information of the first V2X message comprises the communication layer identifier of the first V2X message, and wherein determining the identification information of the first V2X message comprises:
    generating, by the terminal device, the communication layer identifier of the first V2X message.

5. The method according to claim 1, wherein the communication layer identifier of the first V2X message comprises one or more of a layer 2 identifier, an internet protocol (IP) address, or a user datagram protocol (UDP) port number.

6. The method according to claim 5, wherein the layer 2 identifier is a source layer 2 identifier or a destination layer 2 identifier.

7. The method according to claim 1, wherein the service identifier of the first V2X message comprises an application layer identifier of the first V2X message.

8. The method according to claim 1, wherein determining the first identifier identifying the first QoS flow comprises:
    determining, by the terminal device, a first packet filter set by matching the identification information of the first V2X message with identification information in the at least one packet filter set that comprises the identification information of the first V2X message, wherein the first packet filter set corresponds to the first identifier that identifies the first QoS flow.

9. The method according to claim 1, wherein determining the first identifier identifying the first QoS flow comprises:
    determining, by a V2X layer of the terminal, the first identifier.

10. A communications apparatus, wherein the communications apparatus comprises:
    at least one processor; and
    a memory coupled to the at least one processor and storing programming instructions for execution by the at least one processor to perform operations comprising:
    determining identification information of a first vehicle to everything (V2X) message, wherein the identification information of the first V2X message comprises at least one of a service identifier of the first V2X message or a communication layer identifier of the first V2X message;
    determining a first identifier identifying a first quality of service (QoS) flow based on the identification information of the first V2X message and at least one packet filter set; and
    sending the first V2X message by using the first QoS flow.

11. The apparatus according to claim 10, wherein the at least one packet filter set comprises identification information of one or more V2X messages.

12. The apparatus according to claim 11, wherein the operations further comprising:
    determining, based on a correspondence relationship between a packet filter set and an identifier of a QoS flow, the first identifier corresponding to a first packet filter set, wherein the first packet filter set is in the at least one packet filter set and comprises the identification information of the first V2X message.

13. The apparatus according to claim 10, wherein the operations further comprising:
    generating the communication layer identifier of the first V2X message.

14. The apparatus according to claim 10, wherein the communication layer identifier of the first V2X message comprises one or more of a layer 2 identifier, an internet protocol (IP) address, or a user datagram protocol (UDP) port number.

15. The apparatus according to claim 14, wherein the layer 2 identifier is a source layer 2 identifier or a destination layer 2 identifier.

16. The apparatus according to claim 10, wherein the service identifier of the first V2X message comprises an application layer identifier of the first V2X message.

17. The apparatus according to claim 10, wherein the operations further comprising:
    determining a first packet filter set by matching the identification information of the first V2X message with identification information in the at least one packet filter set that comprises the identification information of the first V2X message, wherein the first packet filter set corresponds to the first identifier that identifies the first QoS flow.

18. A non-transitory, computer-readable storage medium storing one or more instructions executable by at least one processor to perform operations comprising:
    determining identification information of a first vehicle to everything (V2X) message, wherein the identification information of the first V2X message comprises a service identifier of the first V2X message or a communication layer identifier of the first V2X message;

determining a first identifier identifying a first quality of service (QoS) flow based on the identification information of the first V2X message and at least one packet filter set; and sending the first V2X message by using the first QoS flow.

19. The non-transitory, computer-readable storage medium according to claim 18, wherein the operations further comprising:

determining a first packet filter set by matching the identification information of the first V2X message with identification information in the at least one packet filter set that comprises the identification information of the first V2X message, wherein the first packet filter set corresponds to the first identifier that identifies the first QoS flow.

20. The non-transitory, computer-readable storage medium according to claim 18, wherein the service identifier of the first V2X message comprises an application layer identifier of the first V2X message.

* * * * *

UNITED STATES PATENT AND TRADEMARK OFFICE
CERTIFICATE OF CORRECTION

| | | |
|---|---|---|
| PATENT NO. | : 11,877,215 B2 | Page 1 of 1 |
| APPLICATION NO. | : 17/325715 | |
| DATED | : January 16, 2024 | |
| INVENTOR(S) | : Jiangwei Ying, Meng Li and Xiao Xiao | |

It is certified that error appears in the above-identified patent and that said Letters Patent is hereby corrected as shown below:

In the Claims

Column 35, Line 17, Claim 1, please delete "device" and insert therefore -- device, --;

Column 35, Line 27, Claim 1, please delete "device" and insert therefore -- device, --.

Signed and Sealed this
Fourth Day of June, 2024

Katherine Kelly Vidal
*Director of the United States Patent and Trademark Office*